US012812501B2

(12) United States Patent
Yapici et al.

(10) Patent No.: US 12,812,501 B2
(45) Date of Patent: Nov. 24, 2026

(54) MULTIPLE ELECTROMAGNETIC RADIATION REFLECTION RELAY NETWORK NODE OPERATIONS

(71) Applicant: QUALCOMM Incorporated, San Diego, CA (US)

(72) Inventors: Yavuz Yapici, Florham Park, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 18/362,783

(22) Filed: Jul. 31, 2023

(65) Prior Publication Data

US 2025/0048230 A1 Feb. 6, 2025

(51) Int. Cl.
*H04W 40/22* (2009.01)
*H04B 7/155* (2006.01)
*H04W 40/12* (2009.01)

(52) U.S. Cl.
CPC ............ *H04W 40/22* (2013.01); *H04B 7/155* (2013.01); *H04W 40/12* (2013.01)

(58) Field of Classification Search
CPC ................ H04B 7/15507; H04B 7/155; H04B 7/15528; H04B 7/15592; H04W 40/12
See application file for complete search history.

(56) References Cited

U.S. PATENT DOCUMENTS

2019/0036754 A1* 1/2019 Lee ..................... H04L 27/2607
2021/0144781 A1 5/2021 Xu et al.
2022/0014935 A1* 1/2022 Haija .................. H04B 17/336
2022/0263566 A1 8/2022 Mehrabani
2024/0258717 A1* 8/2024 Wu ........................ H01Q 13/10
2024/0413858 A1* 12/2024 Mcmenamy .......... H04W 24/10

FOREIGN PATENT DOCUMENTS

CA 3220242 A1 * 12/2022 ......... H01Q 15/0013
CN 103517438 A * 1/2014
WO 2024156074 8/2024

OTHER PUBLICATIONS

International Search Report and Written Opinion—PCT/US2024/030707—ISA/EPO—Nov. 14, 2024.
Partial International Search Report—PCT/US2024/030707—ISA/EPO—Sep. 24, 2024.

* cited by examiner

*Primary Examiner* — Khalid W Shaheed
(74) *Attorney, Agent, or Firm* — Harrity & Harrity, LLP

(57) ABSTRACT

Various aspects of the present disclosure generally relate to wireless communication. In some aspects, a user equipment (UE) may communicate, within a time period, with a network node via a primary communication path comprising a link between the network node and a first electromagnetic radiation reflection relay network node and a link between the first electromagnetic radiation reflection relay network node and the UE. The UE may communicate, within the time period, with the network node via at least one secondary communication path comprising a link between the UE and a second electromagnetic radiation reflection relay network node. Numerous other aspects are described.

30 Claims, 11 Drawing Sheets

MULTIPLE ELECTROMAGNETIC RADIATION REFLECTION RELAY NETWORK NODE OPERATIONS

FIELD OF THE DISCLOSURE

Aspects of the present disclosure generally relate to wireless communication and to techniques and apparatuses for multiple electromagnetic radiation reflection relay network node operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include one or more memories and one or more processors coupled to the one or more memories. The one or more processors may be configured to communicate, within a time period, with a network node via a primary communication path comprising a link between the network node and a first electromagnetic radiation reflection relay network node and a link between the first electromagnetic radiation reflection relay network node and the UE. The one or more processors may be configured to communicate, within the time period, with the network node via at least one secondary communication path comprising a link between the UE and a second electromagnetic radiation reflection relay network node.

Some aspects described herein relate to a network node for wireless communication. The network node may include one or more memories and one or more processors coupled to the one or more memories. The one or more processors may be configured to communicate, within a time period, with a UE via a primary communication path comprising a link between the network node and a first electromagnetic radiation reflection relay network node and a link between the first electromagnetic radiation reflection relay network node and the UE. The one or more processors may be configured to communicate, within the time period, with the UE via at least one secondary communication path comprising a link between the UE and a second electromagnetic radiation reflection relay network node.

Some aspects described herein relate to a first electromagnetic radiation reflection relay network node for wireless communication. The first electromagnetic radiation reflection relay network node may include one or more memories and one or more processors coupled to the one or more memories. The one or more processors may be configured to receive, from a network node, configuration information indicative of a configuration for communicating with a UE. The one or more processors may be configured to communicate, within a time period, with the UE via a primary communication path comprising a link between a network node and the first electromagnetic radiation reflection relay network node and a link between the first electromagnetic radiation reflection relay network node and the UE.

Some aspects described herein relate to a second electromagnetic radiation reflection relay network node for wireless communication. The second electromagnetic radiation reflection relay network node may include one or more memories and one or more processors coupled to the one or more memories. The one or more processors may be configured to receive, from a network node, configuration information indicative of a configuration for communicating with a UE. The one or more processors may be configured to communicate, within a time period, with the UE via a secondary communication path comprising a link between a network node and a first electromagnetic radiation reflection relay network node and a link between the first electromagnetic radiation reflection relay network node and the second electromagnetic radiation reflection relay network node.

Some aspects described herein relate to a method of wireless communication performed by a UE. The method may include communicating, within a time period, with a network node via a primary communication path comprising a link between the network node and a first electromagnetic radiation reflection relay network node and a link between the first electromagnetic radiation reflection relay network node and the UE. The method may include communicating, within the time period, with the network node via at least one secondary communication path comprising a link between the UE and a second electromagnetic radiation reflection relay network node.

Some aspects described herein relate to a method of wireless communication performed by a network node. The method may include communicating, within a time period, with a UE via a primary communication path comprising a link between the network node and a first electromagnetic radiation reflection relay network node and a link between the first electromagnetic radiation reflection relay network node and the UE. The method may include communicating, within the time period, with the UE via at least one secondary communication path comprising a link between the UE and a second electromagnetic radiation reflection relay network node.

Some aspects described herein relate to a method of wireless communication performed by a first electromagnetic radiation reflection relay network node. The method may include receiving, from a network node, configuration information indicative of a configuration for communicating with a UE. The method may include communicating, within a time period, with the UE via a primary communication path comprising a link between a network node and the first electromagnetic radiation reflection relay network node and a link between the first electromagnetic radiation reflection relay network node and the UE.

Some aspects described herein relate to a method of wireless communication performed by a second electromagnetic radiation reflection relay network node. The method may include receiving, from a network node, configuration information indicative of a configuration for communicating with a UE. The method may include communicating, within a time period, with the UE via a secondary communication path comprising a link between a network node and a first electromagnetic radiation reflection relay network node and a link between the first electromagnetic radiation reflection relay network node and the second electromagnetic radiation reflection relay network node.

Some aspects described herein relate to a non-transitory computer-readable medium that stores a set of instructions for wireless communication by a UE. The set of instructions, when executed by one or more processors of the UE, may cause the UE to communicate, within a time period, with a network node via a primary communication path comprising a link between the network node and a first electromagnetic radiation reflection relay network node and a link between the first electromagnetic radiation reflection relay network node and the UE. The set of instructions, when executed by one or more processors of the UE, may cause the UE to communicate, within the time period, with the network node via at least one secondary communication path comprising a link between the UE and a second electromagnetic radiation reflection relay network node.

Some aspects described herein relate to a non-transitory computer-readable medium that stores a set of instructions for wireless communication by a network node. The set of instructions, when executed by one or more processors of the network node, may cause the network node to communicate, within a time period, with a UE via a primary communication path comprising a link between the network node and a first electromagnetic radiation reflection relay network node and a link between the first electromagnetic radiation reflection relay network node and the UE. The set of instructions, when executed by one or more processors of the network node, may cause the network node to communicate, within the time period, with the UE via at least one secondary communication path comprising a link between the UE and a second electromagnetic radiation reflection relay network node.

Some aspects described herein relate to a non-transitory computer-readable medium that stores a set of instructions for wireless communication by a first electromagnetic radiation reflection relay network node. The set of instructions, when executed by one or more processors of the first electromagnetic radiation reflection relay network node, may cause the first electromagnetic radiation reflection relay network node to receive, from a network node, configuration information indicative of a configuration for communicating with a UE. The set of instructions, when executed by one or more processors of the first electromagnetic radiation reflection relay network node, may cause the first electromagnetic radiation reflection relay network node to communicate, within a time period, with the UE via a primary communication path comprising a link between a network node and the first electromagnetic radiation reflection relay network node and a link between the first electromagnetic radiation reflection relay network node and the UE.

Some aspects described herein relate to a non-transitory computer-readable medium that stores a set of instructions for wireless communication by a second electromagnetic radiation reflection relay network node. The set of instructions, when executed by one or more processors of the second electromagnetic radiation reflection relay network node, may cause the second electromagnetic radiation reflection relay network node to receive, from a network node, configuration information indicative of a configuration for communicating with a UE. The set of instructions, when executed by one or more processors of the second electromagnetic radiation reflection relay network node, may cause the second electromagnetic radiation reflection relay network node to communicate, within a time period, with the UE via a secondary communication path comprising a link between a network node and a first electromagnetic radiation reflection relay network node and a link between the first electromagnetic radiation reflection relay network node and the second electromagnetic radiation reflection relay network node.

Some aspects described herein relate to an apparatus for wireless communication. The apparatus may include means for communicating, within a time period, with a network node via a primary communication path comprising a link between the network node and a first electromagnetic radiation reflection relay network node and a link between the first electromagnetic radiation reflection relay network node and the apparatus. The apparatus may include means for communicating, within the time period, with the network node via at least one secondary communication path comprising a link between the apparatus and a second electromagnetic radiation reflection relay network node.

Some aspects described herein relate to an apparatus for wireless communication. The apparatus may include means for communicating, within a time period, with a UE via a primary communication path comprising a link between the apparatus and a first electromagnetic radiation reflection relay network node and a link between the first electromagnetic radiation reflection relay network node and the UE. The apparatus may include means for communicating, within the time period, with the UE via at least one secondary communication path comprising a link between the UE and a second electromagnetic radiation reflection relay network node.

Some aspects described herein relate to an apparatus for wireless communication. The apparatus may include means for receiving, from a network node, configuration information indicative of a configuration for communicating with a UE. The apparatus may include means for communicating, within a time period, with the UE via a primary communication path comprising a link between a network node and the apparatus and a link between the apparatus and the UE.

Some aspects described herein relate to an apparatus for wireless communication. The apparatus may include means for receiving, from a network node, configuration information indicative of a configuration for communicating with a UE. The apparatus may include means for communicating, within a time period, with the UE via a secondary communication path comprising a link between a network node and a first electromagnetic radiation reflection relay network node and a link between the first electromagnetic radiation reflection relay network node and the apparatus.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
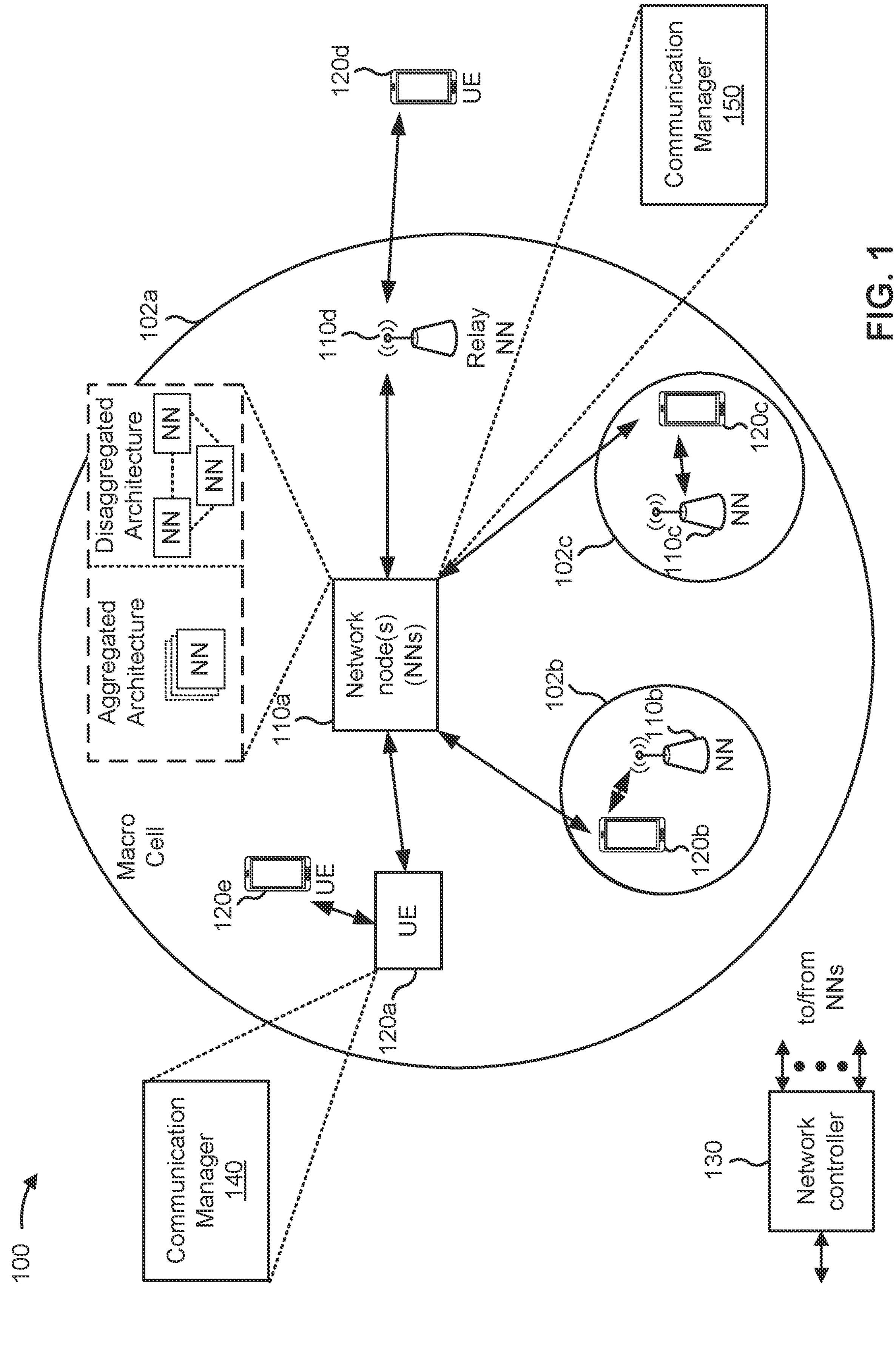
FIG. 1 is a diagram illustrating an example of a wireless network, in accordance with the present disclosure.

In some cases, an obstruction can block a line-of-sight (LoS) communication between a network node and a user equipment (UE). To facilitate communication with the UE, the network node can utilize an electromagnetic radiation reflective relay network node that includes, for example, a radio frequency reflection array configured to perform radio frequency reflection services towards a desired direction (e.g., anomalous reflection). The electromagnetic radiation reflective relay network node can be, for example, a reconfigurable intelligent surface (RIS) (which also can be referred to as an intelligent reflective surface (IRS)). The electromagnetic radiation reflective relay network node can change a direction of a reflection (e.g., can direct a reflection in a particular direction) and/or can perform intentional refraction (e.g., using transmissive-reflective type surfaces). In some cases, a low-deployment cost is likely to proliferate electromagnetic radiation reflective relay network node deployment. However, without efficient coordination among electromagnetic radiation reflective relay network nodes, parallel deployment thereof may result in interference, decreased link stability, and/or inefficient use of network resources.

Some aspects of the techniques described herein may include multi-route (e.g., multi-hop) reflective relay network node strategies and associated signaling aspects for operating multiple electromagnetic radiation reflective relay network nodes while serving a UE. In some aspects, for example a network node may communicate with a UE through a first (e.g., primary) electromagnetic radiation reflective relay network node and at least one additional (e.g., secondary) electromagnetic radiation reflective relay network node. In some aspects, one or more of the at least one additional electromagnetic radiation reflective relay network node may be directly reachable by the network node and, in some aspects, one or more of the at least one additional electromagnetic radiation reflective relay network node may not be directly reachable by the network node. In some aspects, for example, a primary electromagnetic radiation reflective relay network node (which may, in some cases, be referred to as an "assisting node") may facilitate discovering the at least one additional electromagnetic radiation reflective relay network node. The electromagnetic radiation reflective relay network nodes may be used to increase received power of signals at the UE and/or to suppress interference.

In this way, some aspects may include using one or more secondary electromagnetic radiation reflective relay network nodes to avoid link failures without any additional delay due to the multiple network nodes as reflection itself does not incur any delay (e.g., for ultra reliable and low latency communications (URLLC)). As a result, some aspects may positively impact network performance. In some aspects, use of the one or more secondary electromagnetic radiation reflective relay network nodes may decrease interference for locations around a primary communication path. In some aspects, the network node may use the electromagnetic radiation reflection relay network nodes to multiplex UE data (e.g., via spatial division multiplexing (SDM), time division duplexing (TDD), and/or frequency division multiplexing (FDM)) and/or to operate to form primary communication paths and secondary communication paths for robust operation (e.g., to mitigate link failure and/or to minimizing delay to support URLLC schemes).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node

110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may communicate, within a time period, with a network node via a primary communication path comprising a link between the network node and a first electromagnetic radiation reflection relay network node and a link between the first electromagnetic radiation reflection relay network node and the UE; and communicate, within the time period, with the network node via at least one secondary communication path comprising a link between the UE and a second electromagnetic radiation reflection relay network node. Additionally, or alternatively, the communication manager 140 may perform one or more other operations described herein.

In some aspects, a network node (e.g., the network node 110) may include a communication manager 150. As described in more detail elsewhere herein, the communication manager 150 may communicate, within a time period, with a UE via a primary communication path comprising a link between the network node and a first electromagnetic radiation reflection relay network node and a link between the first electromagnetic radiation reflection relay network node and the UE; and communicate, within the time period, with the UE via at least one secondary communication path comprising a link between the UE and a second electromagnetic radiation reflection relay network node.

In some aspects, the communication manager 150 may receive, from a network node, configuration information indicative of a configuration for communicating with a UE; and communicate, within a time period, with the UE via a primary communication path comprising a link between a network node and the first electromagnetic radiation reflection relay network node and a link between the first electromagnetic radiation reflection relay network node and the UE.

In some aspects, the communication manager 150 may receive, from a network node, configuration information indicative of a configuration for communicating with a UE; and communicate, within a time period, with the UE via a secondary communication path comprising a link between a network node and a first electromagnetic radiation reflection relay network node and a link between the first electromagnetic radiation reflection relay network node and the second electromagnetic radiation reflection relay network node. Additionally, or alternatively, the communication manager 150 may perform one or more other operations described herein.

As indicated above, FIG. 1 is provided as an example. Other examples may differ from what is described with regard to FIG. 1.

Figure 2:
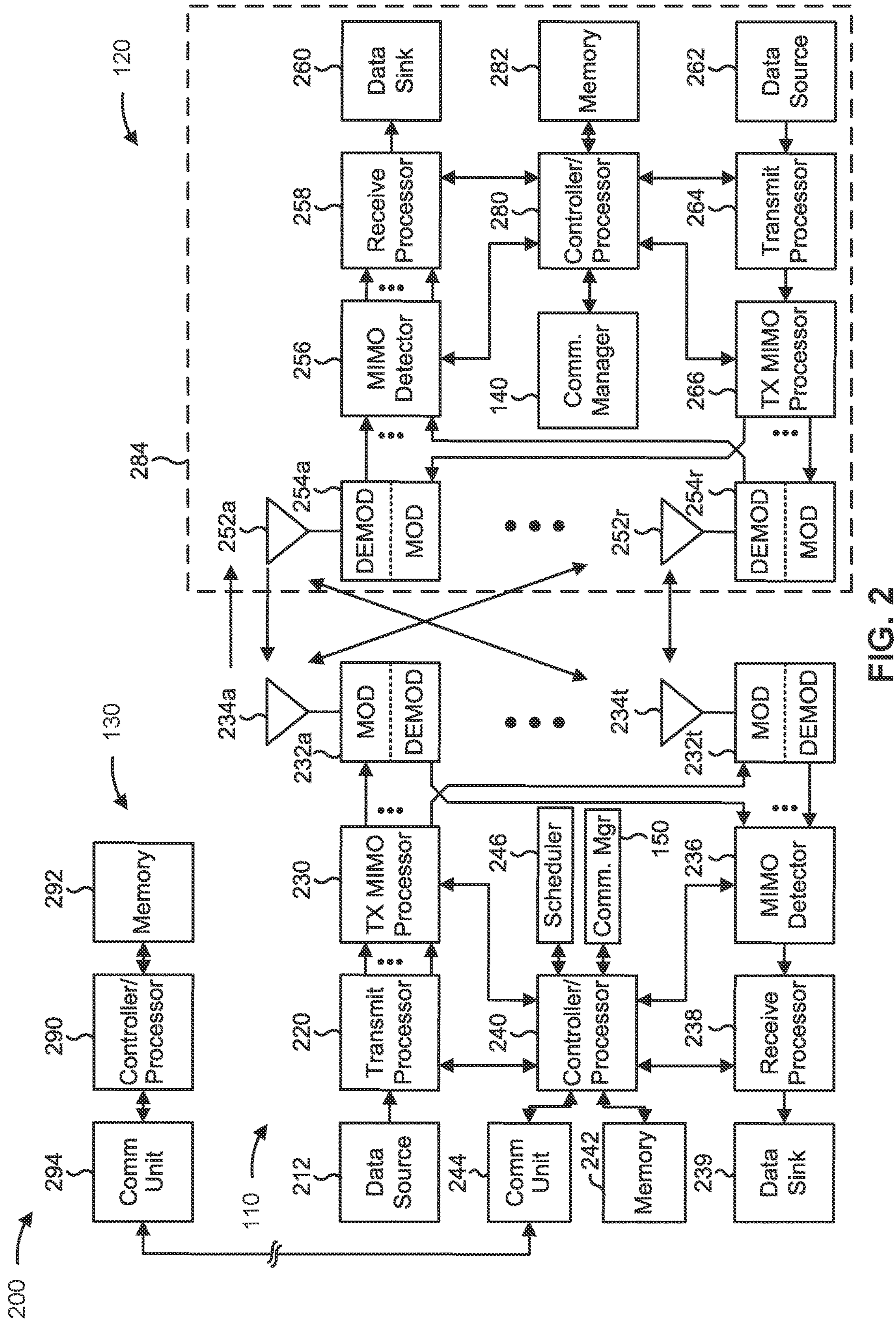
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with multiple electromagnetic radiation reflection relay network node operations, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for communicating, within a time period, with a network node via a primary communication path comprising a link between the network node and a first electromagnetic radiation reflection relay network node and a link between the first electromagnetic radiation reflection relay network node and the UE; and/or means for communicating, within the time period, with the network node via at least one secondary communication path comprising a link between the UE and a second electromagnetic radiation reflection relay network node. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for communicating, within a time period, with a UE via a primary communication path comprising a link between the network node and a first electromagnetic radiation reflection relay network node and a link between the first electromagnetic radiation reflection relay network node and the UE; and/or means for communicating, within the time period, with the UE via at least one secondary communication path comprising a link between the UE and a second electromagnetic radiation reflection relay network node.

In some aspects, a first electromagnetic radiation reflection relay network node (e.g., the network node 110) includes means for receiving, from a network node, configuration information indicative of a configuration for communicating with a UE; and/or means for communicating, within a time period, with the UE via a primary communication path comprising a link between a network node and the first electromagnetic radiation reflection relay network node and a link between the first electromagnetic radiation reflection relay network node and the UE.

In some aspects, a second electromagnetic radiation reflection relay network node (e.g., the network node 110) includes means for receiving, from a network node, configuration information indicative of a configuration for communicating with a UE; and/or means for communicating, within a time period, with the UE via a secondary communication path comprising a link between a network node and a first electromagnetic radiation reflection relay network node and a link between the first electromagnetic radiation reflection relay network node and the second electromagnetic radiation reflection relay network node. The means for the second electromagnetic radiation reflection relay network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
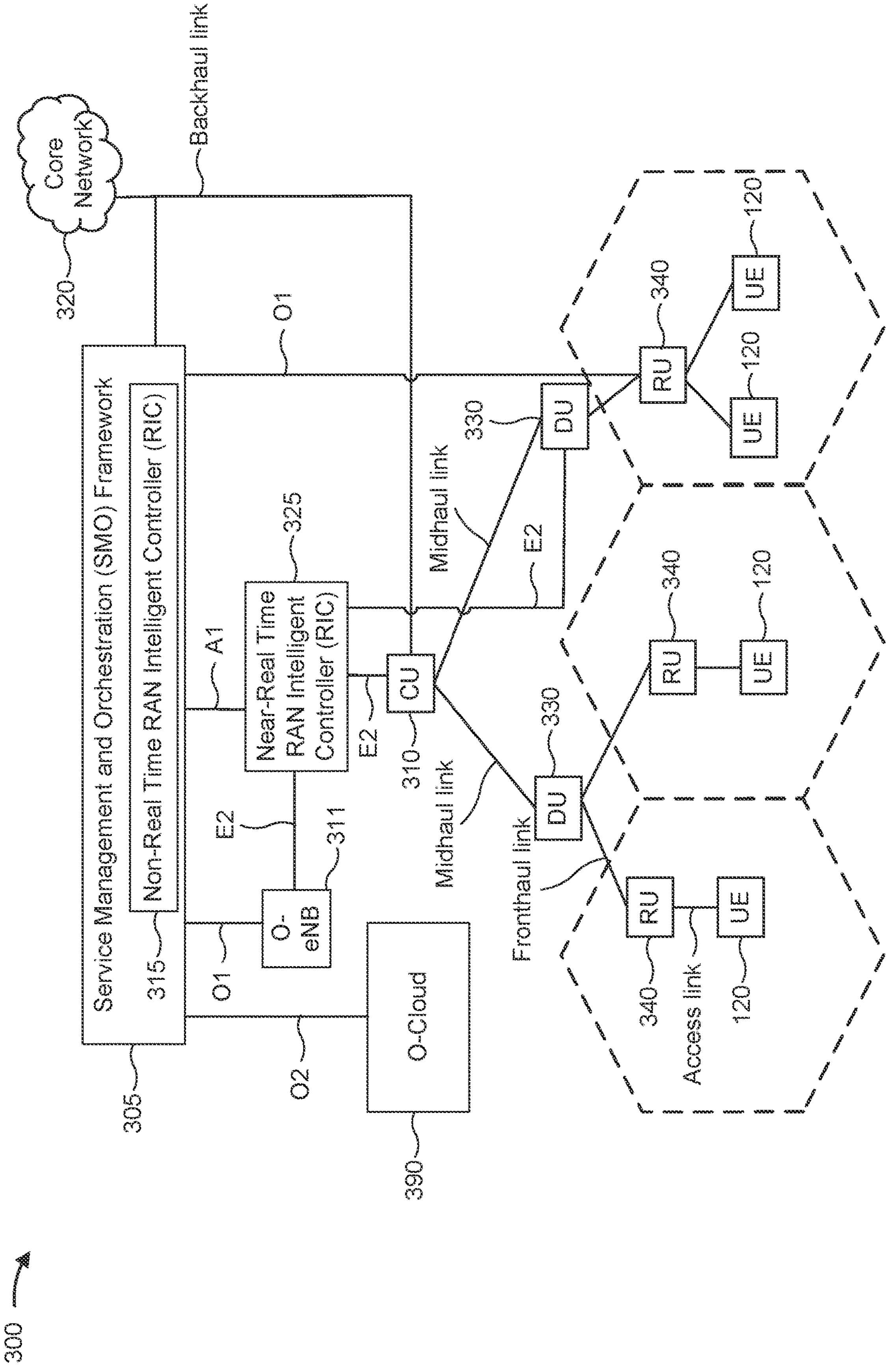
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU

330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
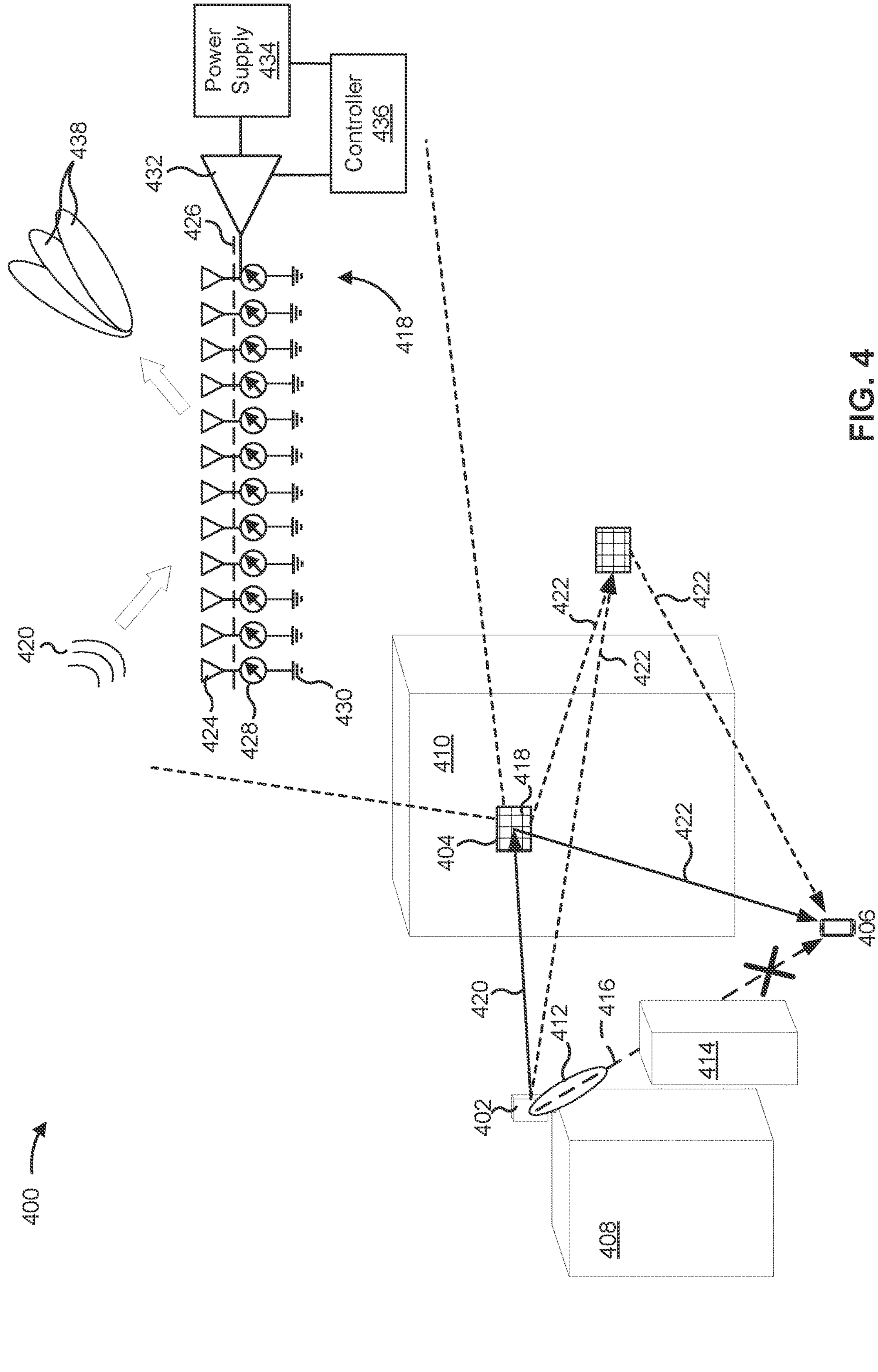
FIG. 4 is a diagram illustrating an example of multiple input multiple output (MIMO) communications, in accordance with the present disclosure.

FIG. 4 is a diagram illustrating an example 400 of MIMO communications, in accordance with the present disclosure. As shown, the example 400 includes a network node 402, a network node 404, and a network node 406. The network nodes 402 and 404 are depicted as being mounted on buildings 408 and 410, respectively. In some cases, one or more of the network nodes 402, 404, and/or 406 may include any number of different types of network nodes such as, for example, base stations, relay devices, DUs. RUs, CUs, and/or UEs, among other examples, and may be self-contained, integrated with any number of other different structures and/or devices, and/or mounted on any number of different types of structures (e.g., vehicles, poles, and/or non-terrestrial network devices, among other examples).

As shown, for example, the network node 402 may communicate with the network node 406 (e.g., a UE). In some cases, for example, the network node 402 can include an antenna panel configured for MIMO communications, in which case the network node 402 can communicate with the network node 406 and another network node simultaneously. In some cases, multiple antenna elements of the antenna panel can be configured to direct a beam 412 to the network node 406. Because MIMO antenna panels include multiple antenna elements, the beam 412 can be beamformed so as to be directed to a target (e.g., the network node 406) a certain distance away from the network node 402.

In some cases, an obstruction 414 can block a line-of-sight (LoS) communication 416 (as indicated by the "X" over the communication 416 arrow) between the network node 402 and the network node 406. To facilitate communication with the network node 406, the network node 402 can utilize the network node 404, which can be an electromagnetic radiation reflective relay network node 404 that includes, for example, a radio frequency reflection array 418 configured to perform radio frequency reflection services.

The electromagnetic radiation reflective relay network node 404 can be, for example, a reconfigurable intelligent surface (RIS) (which also can be referred to as an intelligent reflective surface (IRS)). The electromagnetic radiation reflective relay network node can change a direction of a reflection (e.g., can direct a reflection in a particular direction) and/or can perform intentional refraction (e.g., using transmissive-reflective type surfaces). As shown, for example, the network node 402 can transmit a signal 420 toward the network node 404, which can reflect a reflected signal 422 to the network node 406. In some cases, the reflected signal 422 can be beamformed to be directed specifically at the network node 406.

As shown in FIG. 4, the radio frequency reflection array 418 may include a set of reflecting elements 424 disposed adjacent to a ground plane 426. Each reflecting element 424 can be coupled to a phase shifting component 428, and each phase shifting component 428 can be coupled to a respective grounding component 430. In some aspects, each reflecting element 424 can be coupled to two phase shifting components 428, one for each polarization. In some aspects, one or more reflecting elements 424 can be driven by a power amplifier 432. The power amplifier 432 can be coupled to a power supply 434 and can be controlled by a controller 436. In some cases, for example, the power amplifier 432 can be configured to provide just enough power to offset energy loss due to reflection of a signal and/or phase adjustment thereof. In some cases, a complexity of the controller 436 and/or power consumption by the power amplifier 432 can be based at least in part on selection of phase shifting components 428. In some cases, the radio frequency reflection array 418 can be configured to reflect the signal 420 by beamforming the reflected signal 422 to direct the reflected signal 422 based on one or more beams 438.

In some cases, a low-deployment cost is likely to proliferate electromagnetic radiation reflective relay network node deployment. However, without efficient coordination among electromagnetic radiation reflective relay network nodes, parallel deployment thereof may result in interference, decreased link stability, and/or inefficient use of network resources.

Some aspects of the techniques described herein may include multi-route (e.g., multi-hop) reflective relay network node strategies and associated signaling aspects for operating multiple electromagnetic radiation reflective relay network nodes while serving a UE. In some aspects, for example, a network node may communicate with a UE through a first (e.g., primary) electromagnetic radiation reflective relay network node and at least one additional (e.g., secondary) electromagnetic radiation reflective relay network node. In some aspects, one or more of the at least one additional electromagnetic radiation reflective relay network node may be directly reachable by the network node and, in some aspects, one or more of the at least one additional electromagnetic radiation reflective relay network node may not be directly reachable by the network node. In some aspects, for example, a primary electromagnetic radiation reflective relay network node (which may, in some cases, be referred to as an "assisting node") may facilitate discovering the at least one additional electromagnetic radiation reflective relay network node. The electromagnetic radiation reflective relay network nodes may be used to increase received power of signals at the UE and/or to suppress interference. In some aspects, the one or more secondary electromagnetic radiation reflective relay network nodes may be used to avoid link failures (e.g., for ultra reliable and low latency communications (URLLC)). As a result, some aspects may positively impact network performance.

As indicated above, FIG. 4 is provided as an example. Other examples may differ from what is described with regard to FIG. 4.

Figure 5:
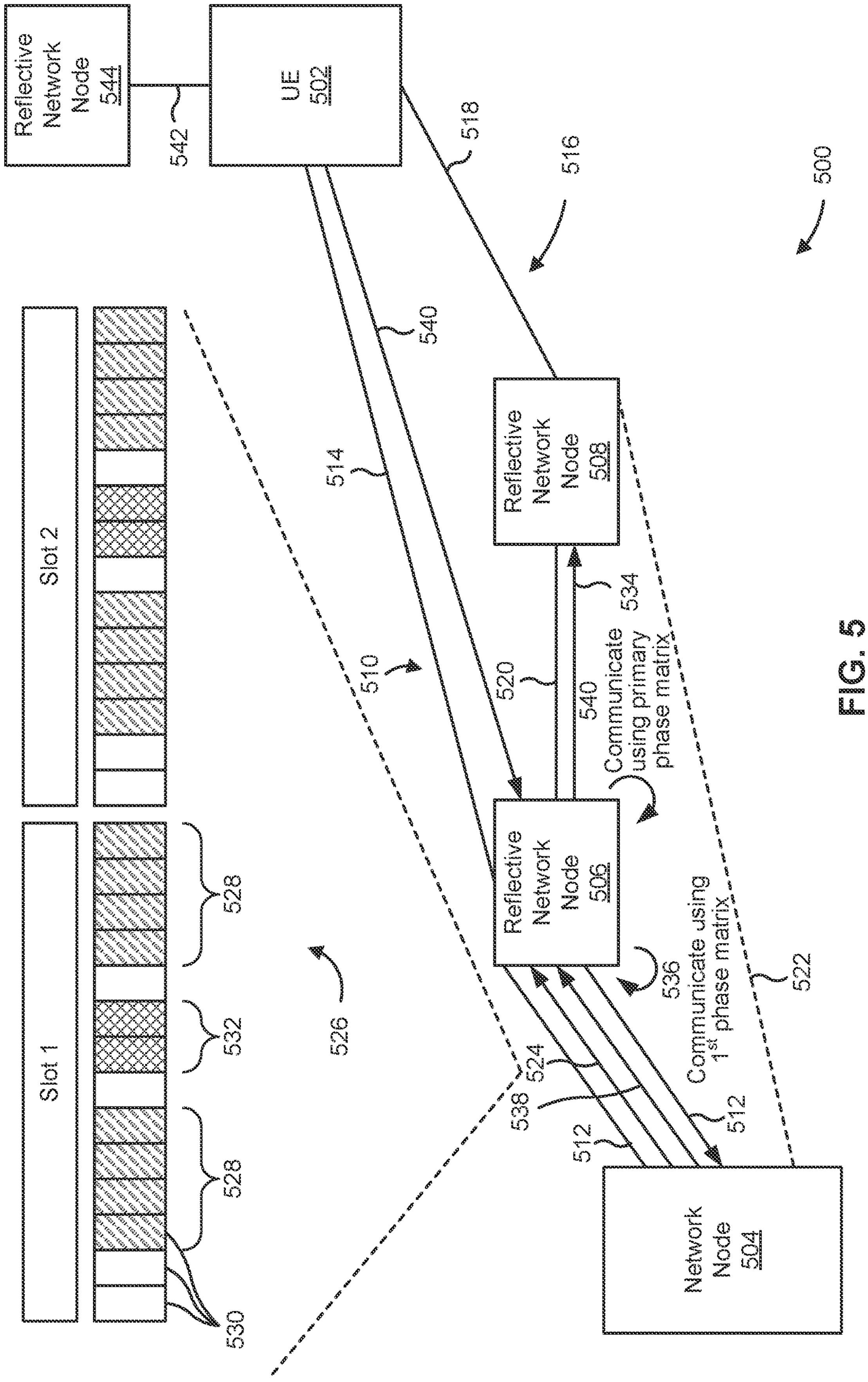
FIG. 5 is a diagram illustrating an example associated with radio frequency reflection arrays having at least one antenna element, in accordance with the present disclosure.

FIG. 5 is a diagram illustrating an example 500 associated with radio frequency reflection arrays having at least one antenna element, in accordance with the present disclosure. As shown in FIG. 5, a UE 502 and a network node 504 may communicate with one another via a first electromagnetic radiation reflective relay network node (shown as "reflective network node") 506 and/or a second electromagnetic radiation reflective relay network node (shown as "reflective network node") 508. In some aspects, each of the reflective network nodes 506 and 508 may include a radio frequency reflection array having at least one antenna element. In some aspects, the UE 502 may be, be similar to, include, or be included in, the UE 120 depicted in FIGS. 1-3 and/or the network node 406 depicted in FIG. 4. In some aspects, the network node 504 may be, be similar to, include, or be included in, the network node 110 depicted in FIGS. 1 and 2, one or more components of the disaggregated base station architecture 300 depicted in FIG. 3, and/or the network node 402 depicted in FIG. 4. In some aspects, the reflective network node 506 and/or the reflective network node 508 may be, be similar to, include, or be included in, the network node 110 depicted in FIGS. 1 and 2, one or more components of the disaggregated base station architecture 300 depicted in FIG. 3, and/or the electromagnetic radiation reflective relay network node 404 depicted in FIG. 4.

As shown in example 500, the network node 504 may communicate with the UE 502 via a primary communication path 510. The primary communication path 510 may include a link 512 between the network node 504 and the electromagnetic radiation reflection relay network node 506 and a link 514 between the electromagnetic radiation reflection relay network node 506 (which may be referred to as a "primary electromagnetic radiation reflection relay network node" or a "primary reflective network node") and the UE 502. In some aspects, the network node 504 may communicate with the UE 502 via a secondary communication path 516. The secondary communication path 516 may include a link 518 between the UE 502 and the electromagnetic radiation reflection relay network node 508 (which may be referred to as a "primary electromagnetic radiation reflection relay network node" or a "primary reflective network node"). In some aspects, the secondary communication path 516 may include a link 520 between the electromagnetic radiation reflection relay network node 508 and the electromagnetic radiation reflection relay network node 506 and the link 512 between the network node 504 and the electromagnetic radiation reflection relay network node 506. In some other aspects, the secondary communication path 516 may include a link 522 between the electromagnetic radiation reflection relay network node 508 and the network node 504.

In some aspects, for example, the network node 504 may be communicating with the UE 502 via the electromagnetic radiation reflection relay network node 506. The network node 504 may reconfigure the electromagnetic radiation reflection relay network node 506 to send synchronization signal blocks (SSBs) associated with the electromagnetic radiation reflection relay network node 506 to find additional electromagnetic radiation reflection relay network nodes that may assist the electromagnetic radiation reflection relay network node 506 with its current active link 510.

For example, as shown by reference number 524, the network node 504 may provide, and the electromagnetic radiation reflection relay network node 506 may obtain, configuration information that configures the first electromagnetic radiation reflection relay network node 506 to transmit at least one synchronization signal block (SSB) associated with the first electromagnetic radiation reflection relay network node 506. In some aspects, the configuration information indicates a time raster 526 for timing transmission of the at least one SSB. In some aspects, the network node 504 may transmit an indication of the time raster 526 (e.g., via a control signal). As shown, for example, the time raster 526 may indicate, for each slot (indicated, for example, as "Slot 1" and "Slot 2"), one or more sets 528 of symbols 530 during which data is to be sent to or from the UE 502, and one or more sets 532 of symbols 530 during which the electromagnetic radiation reflection relay network node 506 is to transmit the SSB. As shown by reference number 534, the electromagnetic radiation reflection relay network node 506 may transmit the SSB to facilitate discovery of one or more additional electromagnetic radiation reflection relay network nodes (e.g., the electromagnetic radiation reflection relay network node 508).

If the network node 504 finds, via the electromagnetic radiation reflection relay network node 506, an additional electromagnetic radiation reflection relay network node (e.g., the electromagnetic radiation reflection relay network node 508), the network node 504 may reconfigure the electromagnetic radiation reflection relay network node 506 with a suitable phase matrix, which is different from the phase matrix being used to serve the UE 502 over only the electromagnetic radiation reflection relay network node 506. For example, as shown by reference number 536, the electromagnetic radiation reflection relay network node 506 may communicate, during an initial time period, with the UE 502 only via the primary communication path 510 in association with a first phase matrix associated with the electromagnetic radiation reflection relay network node 506. As shown by reference number 538, the network node 504 may provide, and the electromagnetic radiation reflection relay network node 506 may obtain, configuration information indicative of a primary phase matrix for communicating with the UE 502 during a time period during which the electromagnetic radiation reflection relay network node 508 also communicates with the UE 502.

Thus, for example, when the network node 504 transmits data to the UE 502, the data may be transmitted to the electromagnetic radiation reflection relay network node 506, which may transmit the data to the UE 502 and to the electromagnetic radiation reflection relay network node 508, which also may transmit the data to the UE 502. In this way, the secondary communication path 516 may be used to assist the primary communication path 510. In some aspects, the secondary communication path 516 may be used to reduce interference to and/or increase the received power of the signals transmitted from the network node 504 to the UE 502. In some aspects, communications from the UE 502 to the network node 504 also may benefit from the secondary communication path 516 in a similar way. For example, the secondary communication path 516 may be used to reduce interference to the primary communication path 510, to compensate for interference to the primary communication path 510, and/or to increase a received power at the network node 504.

In some aspects, the network node 504 may configure a phase matrix of the electromagnetic radiation reflection relay network node 506 to produce either a multi-lobe pattern or a wide-beam pattern to serve the UE 502 over the primary communication path 510 using the link 514 and the assisting link 518. In some aspects, any number of multi-hop node search algorithms (e.g., using upper layers) and their signaling mechanisms may be implemented in conjunction with the assisting communication path techniques described above while building a path redundancy for robustness (e.g., to mitigate link failure), which also may be useful in vehicle-to-X (V2X) applications (e.g., for cluster formation). As shown by reference number 540, the electromagnetic radiation reflection relay network node 506 may communicate with the UE 502 using the primary phase matrix.

As indicated above, in some aspects, the electromagnetic radiation reflection relay network node 506 may communicate via the primary communication path 510 in association with at least one of a wide-beam radiation pattern associated with the electromagnetic radiation reflection relay network node 506 or a multi-lobe radiation pattern associated with the electromagnetic radiation reflection relay network node 506. In some aspects, the electromagnetic radiation reflection relay network node 506 and/or the electromagnetic radiation reflection relay network node 508 may communicate via the secondary communication path 516 in association with at least one of a wide-beam radiation pattern associated with the electromagnetic radiation reflection relay network node 506 or a multi-lobe radiation pattern associated with the electromagnetic radiation reflection relay network node 506.

In some aspects, the network node 504 may communicate with the UE 502 via the primary communication path 510 in association with a first power level associated with the electromagnetic radiation reflection relay network node 506 and a second power level associated with the electromagnetic radiation reflection relay network node 508. In some aspects, the second power level may be higher than the first power level. In this way, for example, the network node 504 may prefer a primary reflective network node beam pattern that directs less power toward the link 514 between the electromagnetic radiation reflection relay network node 506 and the UE 502 to decrease interference for the locations around the link 514. In some aspects, the network node 504 may configure the electromagnetic radiation reflection relay network node 506 to serve the UE 502 only via the secondary communication path 516 to further suppress interference due to the first communication path 510.

In some aspects, the network node 504 may find more than one electromagnetic radiation reflection relay network node that may be configured to serve the UE 502. In some aspects, the network node 504 may use the electromagnetic radiation reflection relay network nodes to multiplex UE data (e.g., via spatial division multiplexing (SDM), time division duplexing (TDD), and/or frequency division multiplexing (FDM)) and/or to operate to form primary communication paths and secondary communication paths for robust operation (e.g., to mitigate link failure and/or to minimizing delay to support URLLC schemes). For example, in some aspects, the network node 504 may communicate via the secondary communication path 516 in association with a URLLC scheme and/or a link failure prediction.

In some aspects, the network node 504 may select the electromagnetic radiation reflection relay network node giving the highest received power at the UE 502 and/or the least interference to a set of spatial directions of interest. In some aspects, for example, the network node 504 may utilize the found electromagnetic radiation reflection relay network nodes based on a received power or multiplexing gain (at the UE 502) being greater than a threshold or an interference (for some direction or directions of interest) being less than a threshold. In some aspects, the network node 504 may utilize the electromagnetic radiation reflection relay network nodes to achieve multiplexing gains via multiplexing techniques such as, for example, SDM (e.g., if an independent beam can be assigned at the network node 504 to each electromagnetic radiation reflection relay network node). If an independent beam is not assigned or assignable at the network node 504 to each electromagnetic radiation reflection relay network node, the network node 504 may use TDD and/or FDM. For example, in some aspects, TDD may be used when the frequency bands of two or more electromagnetic radiation reflection relay network nodes are the same, while FDM may be used when the frequency bands are different.

For example, in some aspects, the network node 504 and/or electromagnetic radiation reflection relay network node 506 communicating via the secondary communication path 516 comprises communicating in accordance with a spatial division multiplexing scheme in which a first beam is associated with the first electromagnetic radiation reflection relay network node and a second beam is associated with the second electromagnetic radiation reflection relay network node. In some aspects, the network node 504 and/or electromagnetic radiation reflection relay network node 506 may communicate via the secondary communication path 516 based on the electromagnetic radiation reflection relay network node 506 and the electromagnetic radiation reflection relay network node 508 being associated with a common frequency band, in accordance with a time division multiplexing scheme (e.g., TDD). In some aspects, the network node 504 and/or electromagnetic radiation reflection relay network node 506 may communicate via the secondary communication path 516 based on the electromagnetic radiation reflection relay network node 506 being associated with a first frequency band and the electromagnetic radiation reflection relay network node 508 being associated with a second, different, frequency band, in accordance with an FDM scheme. In some aspects, the network node 504 and/or electromagnetic radiation reflection relay network node 506 may communicate via the secondary communication path 516 in association with a low-latency communication scheme (e.g., a URLLC scheme). In some aspects, the network node 504 and/or electromagnetic radiation reflection relay network node 506 may communicate via the secondary communication path 516 in association with a link failure prediction.

In some aspects, for example, the UE 502 may provide, and the electromagnetic radiation reflection relay network node 506 may obtain, channel state information (CSI) indicative of a first value of a channel parameter associated with the link 518 between the UE 502 and the electromagnetic radiation reflection relay network node 508 and a second value of the channel parameter associated with a link 542 between the UE 502 and a third electromagnetic radiation reflection relay network node 544. The network node 504 and the electromagnetic radiation reflection relay network node 506 may communicate via the secondary communication path 516 based on the CSI satisfying a link condition. In some aspects, the channel parameter comprises at least one of a received power at the UE 502, a multiplexing gain at the UE 502, or an interference level at the UE 502. In some aspects, the CSI may satisfy the link condition based on the first value satisfying a channel parameter threshold. In some aspects, the CSI may satisfy the link condition based on the first value being greater than the second value. In some aspects, the network node 504 may communicate with the UE 502 via a third communication path (e.g., an additional secondary communication path) that includes the link 542 in addition to, or in lieu of, the secondary communication path 516.

In some aspects, the network node 504 may designate the electromagnetic radiation reflection relay network node 506 as a primary electromagnetic radiation reflection relay network node and the electromagnetic radiation reflection relay network node 508 as a secondary electromagnetic radiation reflection relay network node. In some aspects, the network node 504 may only utilize the secondary electromagnetic radiation reflection relay network node in case of failure of the primary communication path 510. In some aspects, the network node 504 may keep the secondary electromagnetic radiation reflection relay network node occupied (e.g., in a state that prevents the secondary electromagnetic radiation reflection relay network node from being able to be utilized by other network nodes) for use in case of failure of the primary communication path 510. In some aspects, the network node 504 may keep the secondary electromagnetic radiation reflection relay network node occupied based on the communications with the UE 502 being URLLC communications and/or based on a link failure prediction. In this way, some aspects may facilitate providing availability of electromagnetic radiation reflection relay network nodes for secondary communication paths without introducing unnecessary network inefficiencies by tying up electromagnetic radiation reflection relay network nodes without being used except in certain scenarios. In some aspects, the network node 504 may keep the secondary electromagnetic radiation reflection relay network node occupied only for a determined amount of time (e.g., for a predetermined number of symbols, slots, or frames). In some aspects, the network node 504 may provide an indication of the determined amount of time to other network nodes, so that other network nodes may attempt to use unoccupied time resources associated with the electromagnetic radiation reflection relay network node. In some aspects, the occupied (and/or unoccupied) time resources may be indicated using a time raster dynamically (e.g., using download control information) or semi-statically (e.g., using RRC messages). In some aspects, the network node 504 (and/or any other network node taking control of the secondary electromagnetic radiation reflection relay network node) may inform the network of start and/or stop times associated with the use of the electromagnetic radiation reflection relay network node, start and/or stop times associated with a selection process for selecting secondary electromagnetic radiation reflection relay network nodes, and/or start and/or start times associated with using the electromagnetic radiation reflection relay network node as a primary electromagnetic radiation reflection relay network node.

In some aspects, for example, the network node 504 and/or electromagnetic radiation reflection relay network node 506 may communicate via the secondary communication path 516 in association with a set of time resources. The set of time resources may include at least one of a symbol, a slot, or a frame. In some aspects, the network node 504 and/or electromagnetic radiation reflection relay network node 506 may transmit a communication indicative of the set of time resources. The communication may include at least one of an RRC message or a dynamic control communication. In some aspects, the network node 504 and/or electromagnetic radiation reflection relay network node 506 may transmit the communication to at least one additional network node. In some aspects, the network node 504 and/or electromagnetic radiation reflection relay network node 506 may receive, from at least one additional network node, an indication of a selection window associated with at least one additional electromagnetic radiation reflection relay network node.

In some aspects, the network node 504 and/or electromagnetic radiation reflection relay network node 506 receive, from at least one additional network node, an indication of designation of the electromagnetic radiation reflection relay network node 508 as a primary electromagnetic radiation reflection relay network node associated with the at least one additional network node. The network node 504 and/or electromagnetic radiation reflection relay network node 506 may provide, to at least one additional network node, an indication of a selection window associated with at least one additional electromagnetic radiation reflection relay network node. In some aspects, the network node 504 and/or electromagnetic radiation reflection relay network node 506 may provide, to at least one additional network node, an indication of designation of the second electromagnetic radiation reflection relay network node as a primary electromagnetic radiation reflection relay network node associated with the network node.

As indicated above, FIG. 5 is provided as an example. Other examples may differ from what is described with regard to FIG. 5.

Figure 6:
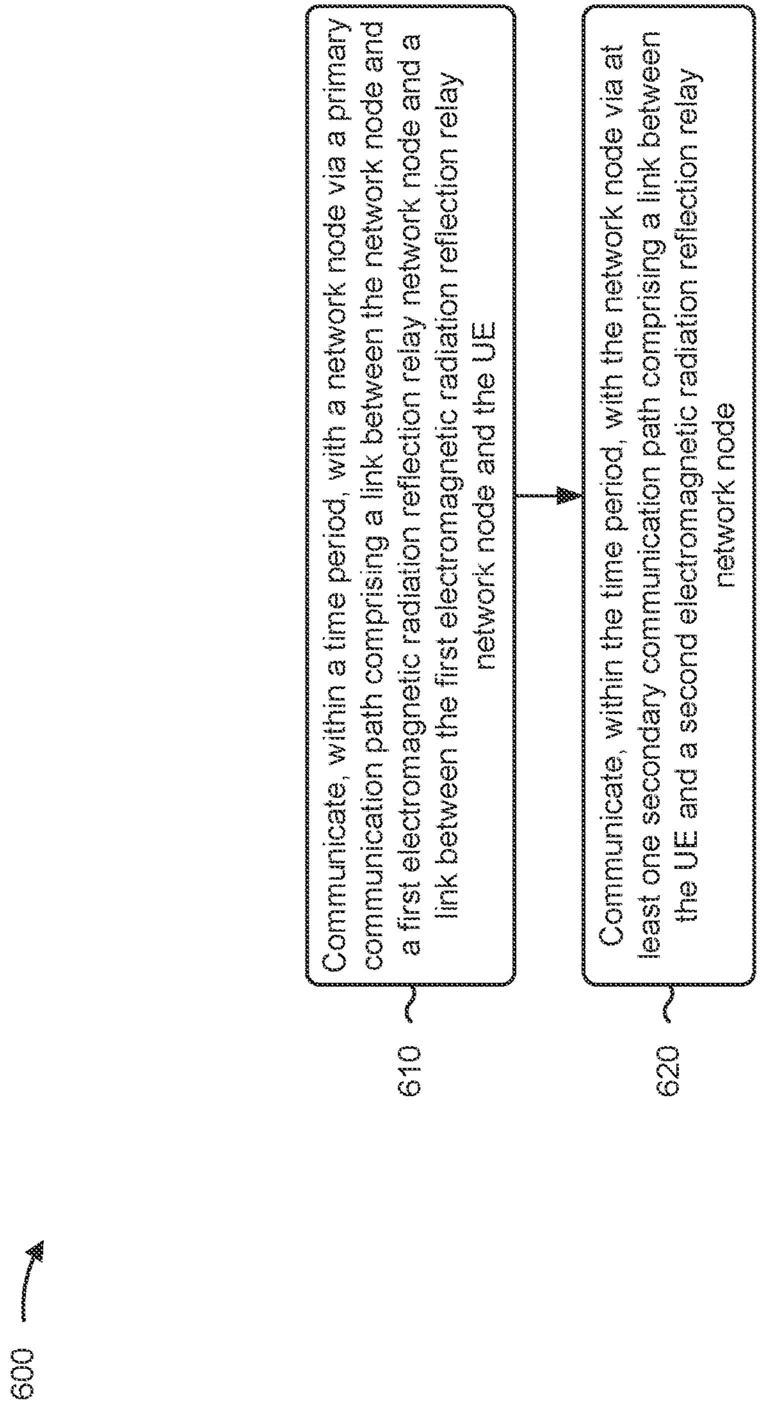
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 502) performs operations associated with multiple electromagnetic radiation reflection relay network node operations.

As shown in FIG. 6, in some aspects, process 600 may include communicating, within a time period, with a network node via a primary communication path comprising a link between the network node and a first electromagnetic radiation reflection relay network node and a link between the first electromagnetic radiation reflection relay network node and the UE (block 610). For example, the UE (e.g., using reception component 1002, transmission component 1004, and/or communication manager 1006, depicted in FIG. 10) may communicate, within a time period, with a network node via a primary communication path comprising a link between the network node and a first electromagnetic radiation reflection relay network node and a link between the first electromagnetic radiation reflection relay network node and the UE, as described above.

As further shown in FIG. 6, in some aspects, process 600 may include communicating, within the time period, with the network node via at least one secondary communication path comprising a link between the UE and a second electromagnetic radiation reflection relay network node (block 620). For example, the UE (e.g., using reception component 1002, transmission component 1004, and/or communication manager 1006, depicted in FIG. 10) may communicate, within the time period, with the network node via at least one secondary communication path comprising a link between the UE and a second electromagnetic radiation reflection relay network node, as described above.

Process 600 may include additional aspects, such as any single aspect or any combination of aspects described below and/or in connection with one or more other processes described elsewhere herein.

In a first aspect, the at least one secondary communication path further comprises a link between the second electromagnetic radiation reflection relay network node and the first electromagnetic radiation reflection relay network node, and a link between the first electromagnetic radiation reflection relay network node and the network node.

In a second aspect, alone or in combination with the first aspect, communicating via the primary communication path comprises communicating data in association with a primary phase matrix associated with the first electromagnetic radiation reflection relay network node and communicating via the at least one secondary communication path comprises communicating the data in association with at least one secondary phase matrix associated with at least one of the second electromagnetic radiation reflection relay network node or at least one additional electromagnetic radiation reflection relay network node. In a third aspect, alone or in combination with one or more of the first and second aspects, communicating via the primary communication path comprises communicating in association with at least one of a wide-beam radiation pattern associated with the first electromagnetic radiation reflection relay network node or a multi-lobe radiation pattern associated with the first electromagnetic radiation reflection relay network node. In a fourth aspect, alone or in combination with one or more of the first through third aspects, communicating via the at least one secondary communication path comprises communicating in association with at least one of a wide-beam radiation pattern associated with the first electromagnetic radiation reflection relay network node or a multi-lobe radiation pattern associated with the first electromagnetic radiation reflection relay network node.

In a fifth aspect, alone or in combination with one or more of the first through fourth aspects, communicating via the primary communication path comprises communicating in association with a first power level associated with the first electromagnetic radiation reflection relay network node, and communicating via the at least one secondary communication path comprises communicating in association with a second power level associated with the second electromagnetic radiation reflection relay network node. In a sixth aspect, alone or in combination with the fifth aspect, the second power level is higher than the first power level.

In a seventh aspect, alone or in combination with one or more of the first through sixth aspects, process 600 includes providing, to the network node, CSI indicative of a first value of a channel parameter associated with the link between the UE and the second electromagnetic radiation reflection relay network node and a second value of the channel parameter associated with a link between the UE and a third electromagnetic radiation reflection relay network node, wherein communicating via the at least one secondary communication path comprises communicating via the at least one secondary communication path based on the CSI satisfying a link condition. In an eighth aspect, alone or in combination with the seventh aspect, the channel parameter comprises at least one of a received power at the UE, a multiplexing gain at the UE, or an interference level at the UE. In a ninth aspect, alone or in combination with one or more of the seventh through eighth aspects, the CSI satisfies the link condition based on the first value satisfying a channel parameter threshold. In a tenth aspect, alone or in combination with one or more of the seventh through ninth aspects, the CSI satisfies the link condition based on the first value being greater than the second value. In an eleventh aspect, alone or in combination with one or more of the seventh through tenth aspects, the at least one secondary communication path comprises the link between the UE and the third electromagnetic radiation reflection relay network node.

In a twelfth aspect, alone or in combination with one or more of the first through eleventh aspects, communicating via the at least one secondary communication path comprises communicating in accordance with a spatial division multiplexing scheme in which a first beam is associated with the first electromagnetic radiation reflection relay network node and a second beam is associated with the second electromagnetic radiation reflection relay network node. In a thirteenth aspect, alone or in combination with one or more of the first through twelfth aspects, communicating via the at least one secondary communication path comprises communicating, based on the first electromagnetic radiation reflection relay network node and the second electromagnetic radiation reflection relay network node being associated with a common frequency band, in accordance with a time division multiplexing scheme. In a fourteenth aspect, alone or in combination with one or more of the first through twelfth aspects, communicating via the at least one secondary communication path comprises communicating, based on the first electromagnetic radiation reflection relay network node being associated with a first frequency band and the second electromagnetic radiation reflection relay network node being associated with a second, different, frequency band, in accordance with a frequency division multiplexing scheme.

In a fifteenth aspect, alone or in combination with one or more of the first through fourteenth aspects, communicating via the at least one secondary communication path comprises communicating via the at least one secondary communication path in association with a low-latency communication scheme. In a sixteenth aspect, alone or in combination with one or more of the first through fifteenth aspects, communicating via the at least one secondary communication path comprises communicating via the at least one secondary communication path in association with a link failure prediction. In a seventeenth aspect, alone or in combination with one or more of the first through sixteenth aspects, communicating via the at least one secondary communication path comprises communicating via the at least one secondary communication path in association with a set of time resources. In an eighteenth aspect, alone or in combination with the seventeenth aspect, the set of time resources comprises at least one of a symbol, a slot, or a frame. In a nineteenth aspect, alone or in combination with one or more of the seventeenth through eighteenth aspects, process 600 includes receiving, from the network node, a communication indicative of the set of time resources. In a twentieth aspect, alone or in combination with the nineteenth aspect, the communication comprises at least one of a radio resource control message or a dynamic control communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
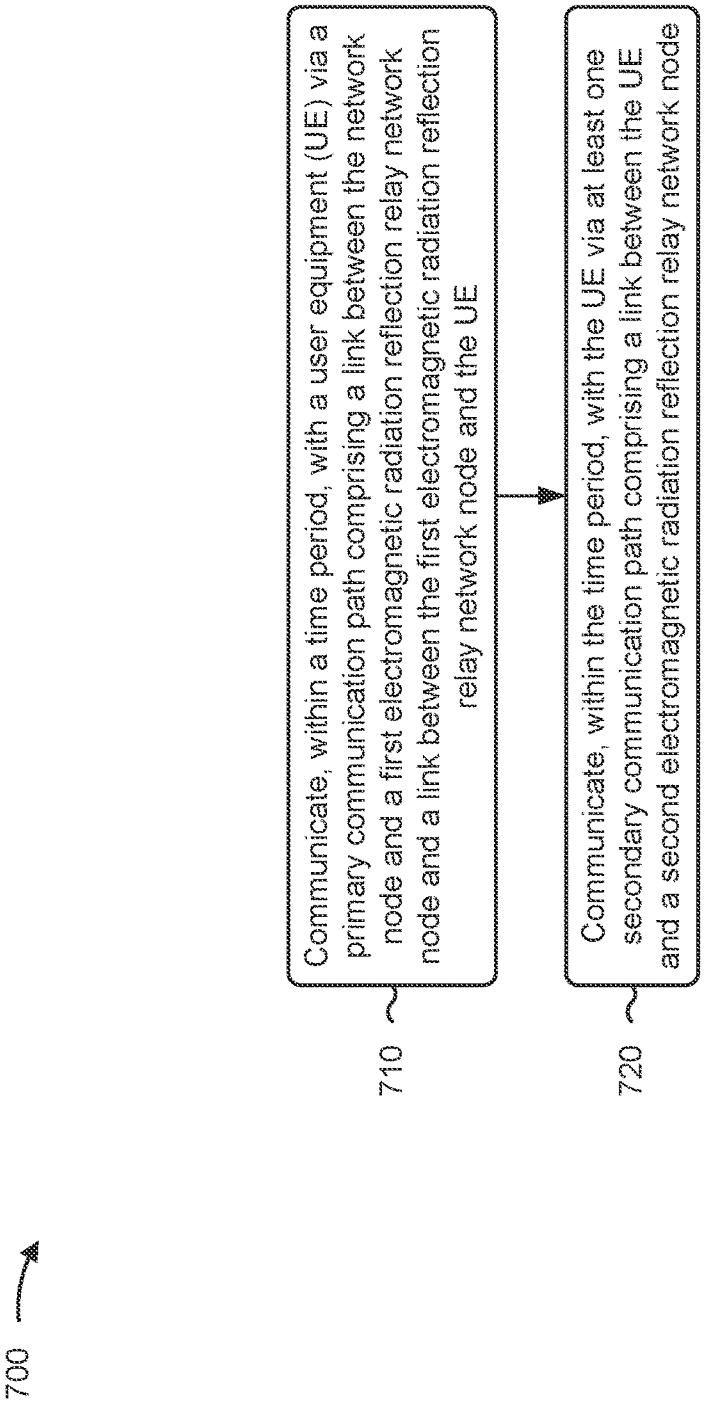
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 504) performs operations associated with multiple electromagnetic radiation reflection relay network node operations.

As shown in FIG. 7, in some aspects, process 700 may include communicating, within a time period, with a UE via a primary communication path comprising a link between the network node and a first electromagnetic radiation reflection relay network node and a link between the first electromagnetic radiation reflection relay network node and the UE (block 710). For example, the network node (e.g., using reception component 1102, transmission component 1104, and/or communication manager 1106, depicted in FIG. 11) may communicate, within a time period, with a UE via a primary communication path comprising a link between the network node and a first electromagnetic radiation reflection relay network node and a link between the first electromagnetic radiation reflection relay network node and the UE, as described above.

As further shown in FIG. 7, in some aspects, process 700 may include communicating, within the time period, with the UE via at least one secondary communication path comprising a link between the UE and a second electromagnetic radiation reflection relay network node (block 720). For example, the network node (e.g., using reception component 1102, transmission component 1104, and/or communication manager 1106, depicted in FIG. 11) may communicate, within the time period, with the UE via at least one secondary communication path comprising a link between the UE and a second electromagnetic radiation reflection relay network node, as described above.

Process 700 may include additional aspects, such as any single aspect or any combination of aspects described below and/or in connection with one or more other processes described elsewhere herein.

In a first aspect, the at least one secondary communication path further comprises a link between the second electromagnetic radiation reflection relay network node and the first electromagnetic radiation reflection relay network node, and a link between the first electromagnetic radiation reflection relay network node and the network node. In a second aspect, alone or in combination with the first aspect, process 700 includes providing, to the first electromagnetic radiation reflection relay network node, configuration information that configures the first electromagnetic radiation reflection relay network node to transmit at least one SSB associated with the first electromagnetic radiation reflection relay network node. In a third aspect, alone or in combination with the second aspect, the configuration information indicates a time raster for timing transmission of the at least one SSB. In a fourth aspect, alone or in combination with one or more of the second through third aspects, process 700 includes providing, to the first electromagnetic radiation reflection relay network node, an indication of a time raster for timing transmission of the at least one SSB.

In a fifth aspect, alone or in combination with one or more of the first through fourth aspects, process 700 includes communicating, during an initial time period occurring prior to the time period, with the UE only via the primary communication path and in association with a first phase matrix associated with the first electromagnetic radiation reflection relay network node, and providing, to the first electromagnetic radiation reflection relay network node, configuration information indicative of a primary phase matrix for communicating with the UE, wherein communicating with the UE via the primary communication path within the time period comprises communicating data in association with the primary phase matrix.

In a sixth aspect, alone or in combination with one or more of the first through fifth aspects, communicating via the primary communication path comprises communicating in association with at least one of a wide-beam radiation pattern associated with the first electromagnetic radiation reflection relay network node or a multi-lobe radiation pattern associated with the first electromagnetic radiation reflection relay network node. In a seventh aspect, alone or in combination with one or more of the first through sixth aspects, communicating via the at least one secondary communication path comprises communicating in association with at least one of a wide-beam radiation pattern associated with the first electromagnetic radiation reflection relay network node or a multi-lobe radiation pattern associated with the first electromagnetic radiation reflection relay network node.

In an eighth aspect, alone or in combination with one or more of the first through seventh aspects, communicating via the primary communication path comprises communicating in association with a first power level associated with the first electromagnetic radiation reflection relay network node, and communicating via the at least one secondary communication path comprises communicating in association with a second power level associated with the second electromagnetic radiation reflection relay network node. In a ninth aspect, alone or in combination with the eighth aspect, the second power level is higher than the first power level.

In a tenth aspect, alone or in combination with one or more of the first through ninth aspects, process 700 includes obtaining, from the UE, CSI indicative of a first value of a channel parameter associated with the link between the UE and the second electromagnetic radiation reflection relay network node and a second value of the channel parameter associated with a link between the UE and a third electromagnetic radiation reflection relay network node, wherein communicating via the at least one secondary communication path comprises communicating via the at least one secondary communication path based on the CSI satisfying a link condition. In an eleventh aspect, alone or in combination with the tenth aspect, the channel parameter comprises at least one of a received power at the UE, a multiplexing gain at the UE, or an interference level at the UE. In a twelfth aspect, alone or in combination with one or more of the tenth through eleventh aspects, the CSI satisfies the link condition based on the first value satisfying a channel parameter threshold. In a thirteenth aspect, alone or in combination with one or more of the tenth through twelfth aspects, the CSI satisfies the link condition based on the first value being greater than the second value. In a fourteenth aspect, alone or in combination with one or more of the tenth through thirteenth aspects, the at least one secondary communication path comprises the link between the UE and the third electromagnetic radiation reflection relay network node.

In a fifteenth aspect, alone or in combination with one or more of the first through fourteenth aspects, process 700 includes designating the first electromagnetic radiation reflection relay network node as a primary electromagnetic radiation reflection relay network node and the second electromagnetic radiation reflection relay network node as a second electromagnetic radiation reflection relay network node. In a sixteenth aspect, alone or in combination with one or more of the first through fifteenth aspects, communicating via the at least one secondary communication path comprises communicating in accordance with a spatial division multiplexing scheme in which a first beam is associated with the first electromagnetic radiation reflection relay network node and a second beam is associated with the second electromagnetic radiation reflection relay network node. In a seventeenth aspect, alone or in combination with one or more of the first through sixteenth aspects, communicating via the at least one secondary communication path comprises communicating, based on the first electromagnetic radiation reflection relay network node and the second electromagnetic radiation reflection relay network node being associated with a common frequency band, in accordance with a time division multiplexing scheme. In an eighteenth aspect, alone or in combination with one or more of the first through sixteenth aspects, communicating via the at least one secondary communication path comprises communicating, based on the first electromagnetic radiation reflection relay network node being associated with a first frequency band and the second electromagnetic radiation reflection relay network node being associated with a second, different, frequency band, in accordance with a frequency division multiplexing scheme.

In a nineteenth aspect, alone or in combination with one or more of the first through eighteenth aspects, communicating via the at least one secondary communication path comprises communicating via the at least one secondary communication path in association with a low-latency communication scheme. In a twentieth aspect, alone or in combination with one or more of the first through nineteenth aspects, communicating via the at least one secondary communication path comprises communicating via the at least one secondary communication path in association with a link failure prediction. In a twenty-first aspect, alone or in combination with one or more of the first through twentieth aspects, communicating via the at least one secondary communication path comprises communicating via the at least one secondary communication path in association with a set of time resources. In a twenty-second aspect, alone or in combination with the twenty-first aspect, the set of time resources comprises at least one of a symbol, a slot, or a frame. In a twenty-third aspect, alone or in combination with one or more of the twenty-first through twenty-second aspects, process 700 includes transmitting a communication indicative of the set of time resources. In a twenty-fourth aspect, alone or in combination with the twenty-third aspect, the communication comprises at least one of a radio resource control message or a dynamic control communication. In a twenty-fifth aspect, alone or in combination with the twenty-fourth aspect, transmitting the communication comprises transmitting the communication to at least one additional network node. In a twenty-sixth aspect, alone or in combination with one or more of the first through twenty-fifth aspects, process 700 includes receiving, from at least one additional network node, an indication of a selection window associated with at least one additional electromagnetic radiation reflection relay network node.

In a twenty-seventh aspect, alone or in combination with one or more of the first through twenty-sixth aspects, process 700 includes receiving, from at least one additional network node, an indication of designation of the second electromagnetic radiation reflection relay network node as a primary electromagnetic radiation reflection relay network node associated with the at least one additional network node. In a twenty-eighth aspect, alone or in combination with one or more of the first through twenty-seventh aspects, process 700 includes providing, to at least one additional network node, an indication of a selection window associated with at least one additional electromagnetic radiation reflection relay network node. In a twenty-ninth aspect, alone or in combination with one or more of the first through twenty-eighth aspects, process 700 includes providing, to at least one additional network node, an indication of designation of the second electromagnetic radiation reflection relay network node as a primary electromagnetic radiation reflection relay network node associated with the network node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
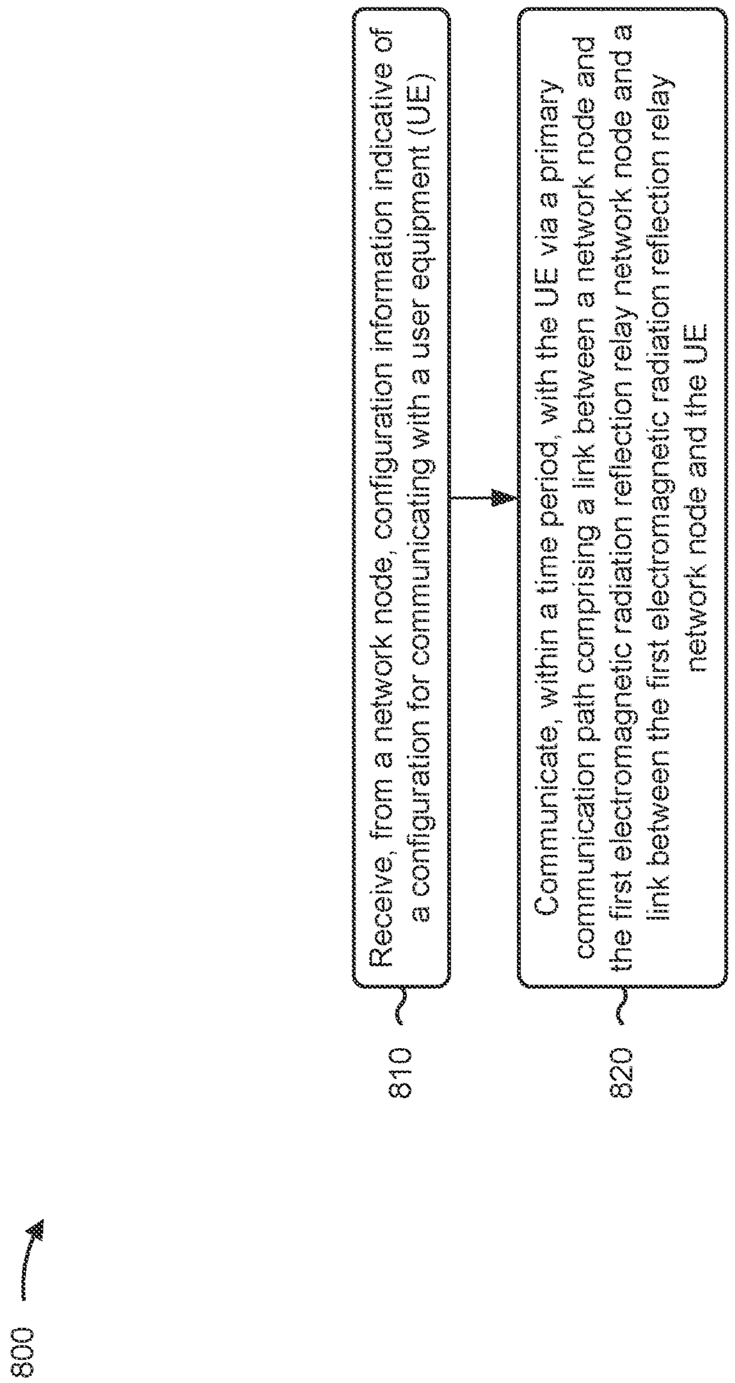
FIG. 8 is a diagram illustrating an example process performed, for example, by a first electromagnetic radiation reflection relay network node, in accordance with the present disclosure.

FIG. 8 is a diagram illustrating an example process 800 performed, for example, by a first electromagnetic radiation reflection relay network node, in accordance with the present disclosure. Example process 800 is an example where the first electromagnetic radiation reflection relay network node (e.g., electromagnetic radiation reflection relay network node 506) performs operations associated with multiple electromagnetic radiation reflection relay network node operations.

As shown in FIG. 8, in some aspects, process 800 may include receiving, from a network node, configuration information indicative of a configuration for communicating with a UE (block 810). For example, the first electromagnetic radiation reflection relay network node (e.g., using reception component 1102 and/or communication manager 1106, depicted in FIG. 11) may receive, from a network node, configuration information indicative of a configuration for communicating with a UE, as described above.

As further shown in FIG. 8, in some aspects, process 800 may include communicating, within a time period, with the UE via a primary communication path comprising a link between a network node and the first electromagnetic radiation reflection relay network node and a link between the first electromagnetic radiation reflection relay network node and the UE (block 820). For example, the first electromagnetic radiation reflection relay network node (e.g., using reception component 1102, transmission component 1104, and/or communication manager 1106, depicted in FIG. 11) may communicate, within a time period, with the UE via a primary communication path comprising a link between a network node and the first electromagnetic radiation reflection relay network node and a link between the first electromagnetic radiation reflection relay network node and the UE, as described above.

Process 800 may include additional aspects, such as any single aspect or any combination of aspects described below and/or in connection with one or more other processes described elsewhere herein.

In a first aspect, process 800 includes receiving, from the network node, additional configuration information that configures the first electromagnetic radiation reflection relay network node to transmit at least one SSB associated with the first electromagnetic radiation reflection relay network node, and transmitting the at least one SSB. In a second aspect, alone or in combination with the first aspect, the configuration information indicates a time raster for timing transmission of the at least one SSB, wherein transmitting the at least one SSB comprises transmitting the at least one SSB based on the time raster. In a third aspect, alone or in combination with one or more of the first and second aspects, process 800 includes obtaining, from the network node, an indication of a time raster for timing transmission of the at least one SSB, wherein transmitting the at least one SSB comprises transmitting the at least one SSB based on the time raster.

In a fourth aspect, alone or in combination with one or more of the first through third aspects, process 800 includes communicating, during an initial time period occurring prior to the time period, with the UE only via the primary communication path and in association with a first phase matrix associated with the first electromagnetic radiation reflection relay network node, and obtaining, from the network node, configuration information indicative of a primary phase matrix for communicating with the UE, wherein communicating with the UE via the primary communication path within the time period comprises communicating data in association with the primary phase matrix. In a fifth aspect, alone or in combination with one or more of the first through fourth aspects, communicating via the primary communication path comprises communicating in association with at least one of a wide-beam radiation pattern associated with the first electromagnetic radiation reflection relay network node or a multi-lobe radiation pattern associated with the first electromagnetic radiation reflection relay network node.

In a sixth aspect, alone or in combination with one or more of the first through fifth aspects, process 800 includes communicating, within the time period, with the UE via at least one secondary communication path comprising a link between the UE and a second electromagnetic radiation reflection relay network node, a link between the second electromagnetic radiation reflection relay network node and the first electromagnetic radiation reflection relay network node, and the link between the network node and the first electromagnetic radiation reflection relay network node. In a seventh aspect, alone or in combination with the sixth aspect, communicating via the at least one secondary communication path comprises communicating in association with at least one of a wide-beam radiation pattern associated with the first electromagnetic radiation reflection relay network node or a multi-lobe radiation pattern associated with the first electromagnetic radiation reflection relay network node. In an eighth aspect, alone or in combination with one or more of the sixth through seventh aspects, communicating via the primary communication path comprises communicating in association with a first power level associated with the first electromagnetic radiation reflection relay network node, and communicating via the at least one secondary communication path comprises communicating in association with a second power level associated with the second electromagnetic radiation reflection relay network node. In a ninth aspect, alone or in combination with the eighth aspect, the second power level is higher than the first power level.

In a tenth aspect, alone or in combination with one or more of the sixth through ninth aspects, communicating via the at least one secondary communication path comprises communicating in accordance with a spatial division multiplexing scheme in which a first beam is associated with the first electromagnetic radiation reflection relay network node and a second beam is associated with the second electromagnetic radiation reflection relay network node. In an eleventh aspect, alone or in combination with one or more of the sixth through tenth aspects, communicating via the at least one secondary communication path comprises communicating, based on the first electromagnetic radiation reflection relay network node and the second electromagnetic radiation reflection relay network node being associated with a common frequency band, in accordance with a time division multiplexing scheme. In a twelfth aspect, alone or in combination with one or more of the sixth through eleventh aspects, communicating via the at least one secondary communication path comprises communicating, based on the first electromagnetic radiation reflection relay network node being associated with a first frequency band and the second electromagnetic radiation reflection relay network node being associated with a second, different, frequency band, in accordance with a frequency division multiplexing scheme. In a thirteenth aspect, alone or in combination with one or more of the sixth through twelfth aspects, communicating via the at least one secondary communication path comprises communicating via the at least one secondary communication path in association with a low-latency communication scheme. In a fourteenth aspect, alone or in combination with the thirteenth aspect, communicating via the at least one secondary communication path comprises communicating via the at least one secondary communication path in association with a link failure prediction.

In a fifteenth aspect, alone or in combination with one or more of the sixth through fourteenth aspects, communicating via the at least one secondary communication path comprises communicating via the at least one secondary communication path in association with a set of time resources. In a sixteenth aspect, alone or in combination with the fifteenth aspect, the set of time resources comprises at least one of a symbol, a slot, or a frame. In a seventeenth aspect, alone or in combination with one or more of the fifteenth through sixteenth aspects, process 800 includes transmitting a communication indicative of the set of time resources. In an eighteenth aspect, alone or in combination with the seventeenth aspect, the communication comprises at least one of a radio resource control message or a dynamic control communication. In a nineteenth aspect, alone or in combination with one or more of the seventeenth through eighteenth aspects, transmitting the communication comprises transmitting the communication to at least one additional network node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
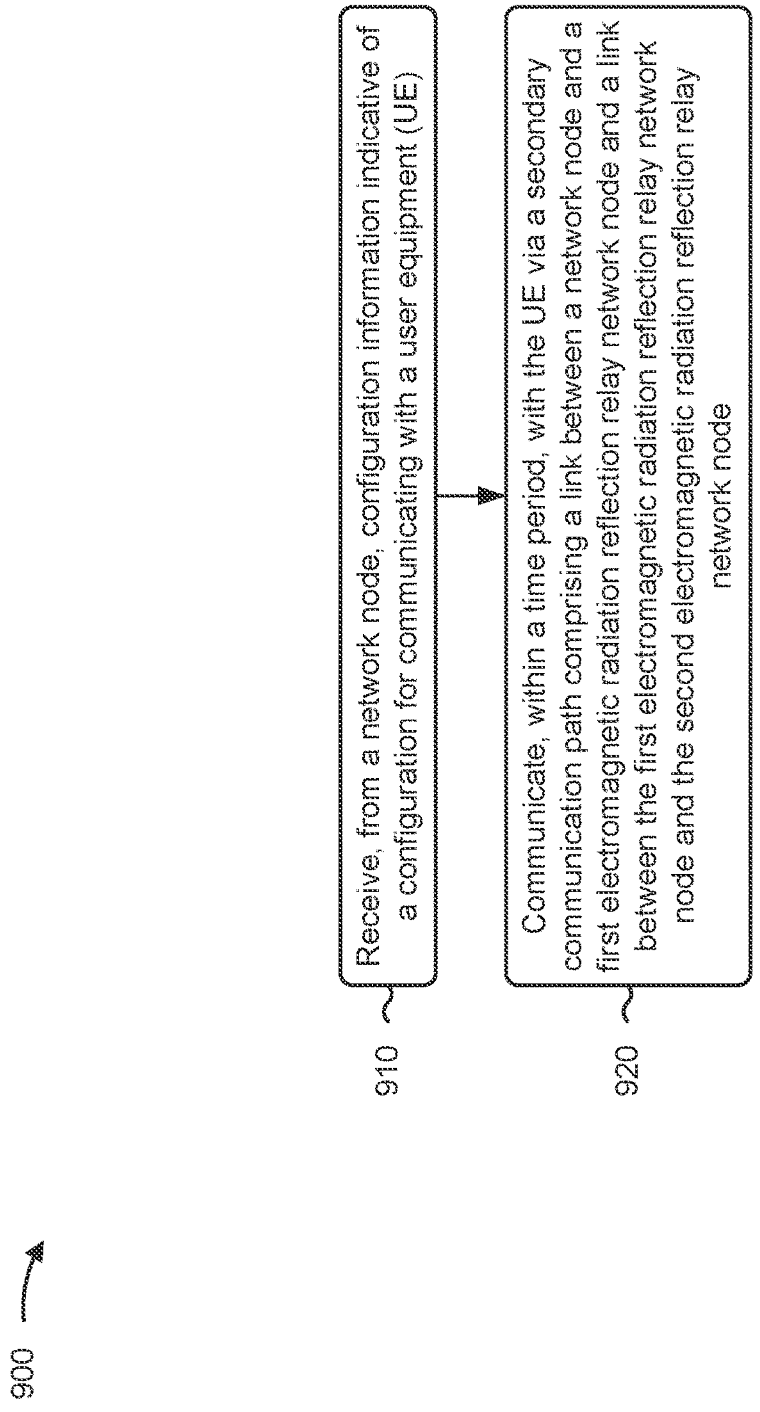
FIG. 9 is a diagram illustrating an example process performed, for example, by a second electromagnetic radiation reflection relay network node, in accordance with the present disclosure.

FIG. 9 is a diagram illustrating an example process 900 performed, for example, by a second electromagnetic radiation reflection relay network node, in accordance with the present disclosure. Example process 900 is an example where the second electromagnetic radiation reflection relay network node (e.g., electromagnetic radiation reflection relay network node 508) performs operations associated with multiple electromagnetic radiation reflection relay network node operations.

As shown in FIG. 9, in some aspects, process 900 may include receiving, from a network node, configuration information indicative of a configuration for communicating with a UE (block 910). For example, the second electromagnetic radiation reflection relay network node (e.g., using reception component 1102 and/or communication manager 1106, depicted in FIG. 11) may receive, from a network node, configuration information indicative of a configuration for communicating with a UE, as described above.

As further shown in FIG. 9, in some aspects, process 900 may include communicating, within a time period, with the UE via a secondary communication path comprising a link between a network node and a first electromagnetic radiation reflection relay network node and a link between the first electromagnetic radiation reflection relay network node and the second electromagnetic radiation reflection relay network node (block 920). For example, the second electromagnetic radiation reflection relay network node (e.g., using reception component 1102, transmission component 1104, and/or communication manager 1106, depicted in FIG. 11) may communicate, within a time period, with the UE via a secondary communication path comprising a link between a network node and a first electromagnetic radiation reflection relay network node and a link between the first electromagnetic radiation reflection relay network node and the second electromagnetic radiation reflection relay network node, as described above.

Process 900 may include additional aspects, such as any single aspect or any combination of aspects described below and/or in connection with one or more other processes described elsewhere herein.

In a first aspect, process 900 includes receiving, from the first electromagnetic radiation reflection relay network node, at least one SSB associated with the first electromagnetic radiation reflection relay network node, wherein communicating with the UE via the secondary communication path comprises communicating with the UE via the secondary communication path based on receiving the at least one SSB. In a second aspect, alone or in combination with the first aspect, communicating via the secondary communication path comprises communicating in association with at least one of a wide-beam radiation pattern associated with the first electromagnetic radiation reflection relay network node or a multi-lobe radiation pattern associated with the first electromagnetic radiation reflection relay network node.

In a third aspect, alone or in combination with one or more of the first and second aspects, communicating via the secondary communication path comprises communicating in association with a second power level associated with the second electromagnetic radiation reflection relay network node, the second power level being different than a first power level associated with a primary communication path comprising a link between the network node and the first electromagnetic radiation reflection relay network node and a link between the first electromagnetic radiation reflection relay network node and the UE. In a fourth aspect, alone or in combination with the third aspect, the second power level is higher than the first power level. In a fifth aspect, alone or in combination with one or more of the first through fourth aspects, communicating via the secondary communication path comprises communicating in accordance with a spatial division multiplexing scheme in which a first beam is associated with the first electromagnetic radiation reflection relay network node and a second beam is associated with the second electromagnetic radiation reflection relay network node.

In a sixth aspect, alone or in combination with one or more of the first through fifth aspects, communicating via the secondary communication path comprises communicating, based on the first electromagnetic radiation reflection relay network node and the second electromagnetic radiation reflection relay network node being associated with a common frequency band, in accordance with a time division multiplexing scheme. In a seventh aspect, alone or in combination with one or more of the first through sixth aspects, communicating via the secondary communication path comprises communicating, based on the first electromagnetic radiation reflection relay network node being associated with a first frequency band and the second electromagnetic radiation reflection relay network node being associated with a second, different, frequency band, in accordance with a frequency division multiplexing scheme.

In an eighth aspect, alone or in combination with one or more of the first through seventh aspects, communicating via the secondary communication path comprises communicating via the secondary communication path in association with a low-latency communication scheme. In a ninth aspect, alone or in combination with one or more of the first through eighth aspects, communicating via the secondary communication path comprises communicating via the secondary communication path in association with a link failure prediction. In a tenth aspect, alone or in combination with one or more of the first through ninth aspects, communicating via the secondary communication path comprises communicating via the secondary communication path in association with a set of time resources. In an eleventh aspect, alone or in combination with the tenth aspect, the set of time resources comprises at least one of a symbol, a slot, or a frame.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
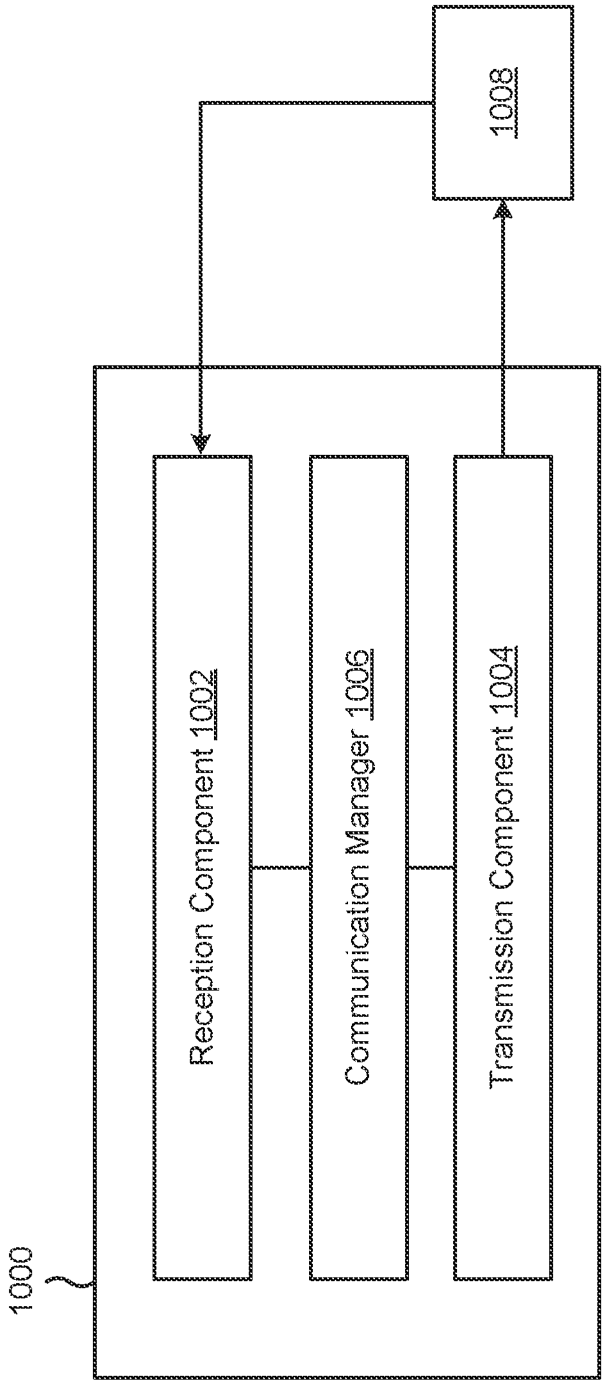
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIG. 5. Additionally, or alternatively, the apparatus 1000 may be configured to perform one or more processes described herein, such as process 600 of FIG. 6. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 and/or the transmission component 1004 may communicate, within a time period, with a network node via a primary communication path comprising a link between the network node and a first electromagnetic radiation reflection relay network node and a link between the first electromagnetic radiation reflection relay network node and the UE. The reception component 1002 and/or the transmission component 1004 may communicate, within the time period, with the network node via at least one secondary communication path comprising a link between the UE and a second electromagnetic radiation reflection relay network node.

The communication manager 1006 may provide, to the network node, CSI indicative of a first value of a channel parameter associated with the link between the UE and the second electromagnetic radiation reflection relay network node and a second value of the channel parameter associated with a link between the UE and a third electromagnetic radiation reflection relay network node, wherein communicating via the at least one secondary communication path comprises communicating via the at least one secondary communication path based on the CSI satisfying a link condition. The reception component 1002 may receive, from the network node, a communication indicative of the set of time resources.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
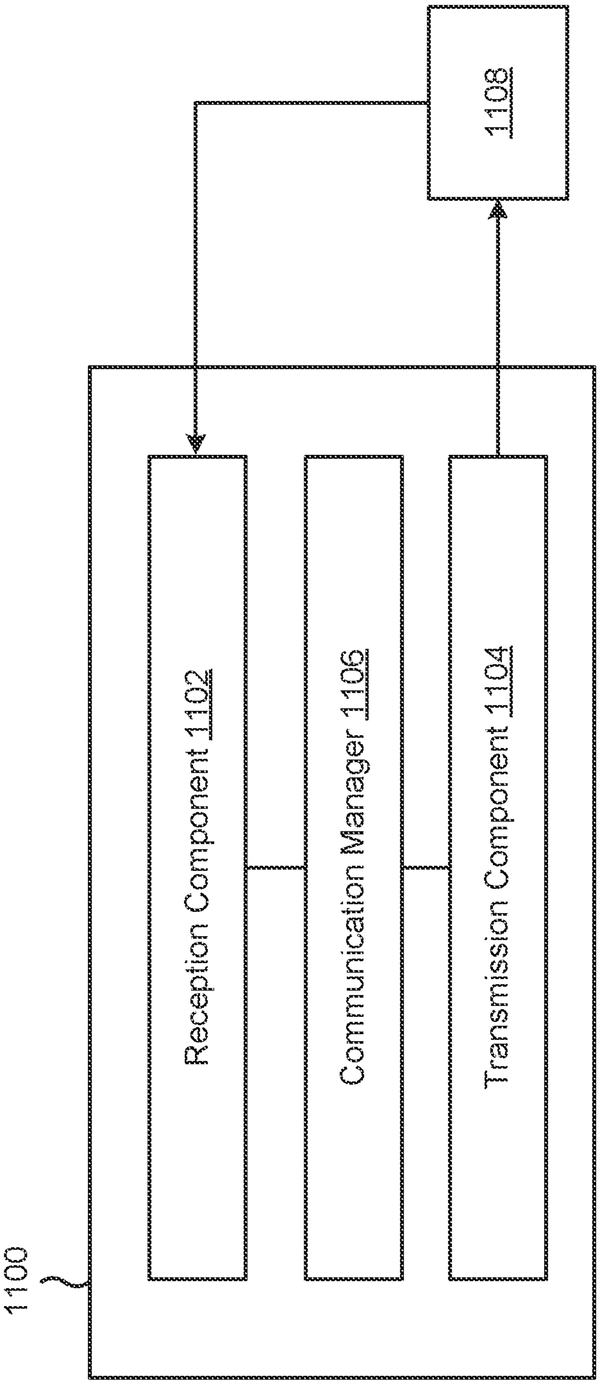
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 5. Additionally, or alternatively, the apparatus 1100 may be configured to perform one or more processes described herein, such as process 700 of FIG. 7, process 800 of FIG. 8, process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 and/or the transmission component 1104 may communicate, within a time period, with a UE via a primary communication path comprising a link between the network node and a first electromagnetic radiation reflection relay network node and a link between the first electromagnetic radiation reflection relay network node and the UE. The reception component 1102 and/or the transmission component 1104 may communicate, within the time period, with the UE via at least one secondary communication path comprising a link between the UE and a second electromagnetic radiation reflection relay network node.

The communication manager 1106 may provide, to the first electromagnetic radiation reflection relay network node, configuration information that configures the first electromagnetic radiation reflection relay network node to transmit at least one SSB associated with the first electromagnetic radiation reflection relay network node. The communication manager 1106 may provide, to the first electromagnetic radiation reflection relay network node, an indication of a time raster for timing transmission of the at least one SSB. The communication manager 1106 may communicate, during an initial time period occurring prior to the time period, with the UE only via the primary communication path and in association with a first phase matrix associated with the first electromagnetic radiation reflection relay network node. The communication manager 1106 may provide, to the first electromagnetic radiation reflection relay network node, configuration information indicative of a primary phase matrix for communicating with the UE, wherein communicating with the UE via the primary communication path within the time period comprises communicating data in association with the primary phase matrix.

The reception component 1102 may obtain, from the UE, CSI indicative of a first value of a channel parameter associated with the link between the UE and the second electromagnetic radiation reflection relay network node and a second value of the channel parameter associated with a link between the UE and a third electromagnetic radiation reflection relay network node, wherein communicating via the at least one secondary communication path comprises communicating via the at least one secondary communication path based on the CSI satisfying a link condition. The communication manager 1106 may designate the first electromagnetic radiation reflection relay network node as a primary electromagnetic radiation reflection relay network node and the second electromagnetic radiation reflection relay network node as a second electromagnetic radiation reflection relay network node. The transmission component 1104 may transmit a communication indicative of the set of time resources. The reception component 1102 may receive, from at least one additional network node, an indication of a selection window associated with at least one additional electromagnetic radiation reflection relay network node.

The reception component 1102 may receive, from at least one additional network node, an indication of designation of the second electromagnetic radiation reflection relay network node as a primary electromagnetic radiation reflection relay network node associated with the at least one additional network node. The communication manager 1106 may provide, to at least one additional network node, an indication of a selection window associated with at least one additional electromagnetic radiation reflection relay network node. The communication manager 1106 may provide, to at least one additional network node, an indication of designation of the second electromagnetic radiation reflection relay network node as a primary electromagnetic radiation reflection relay network node associated with the network node.

The reception component 1102 may receive, from a network node, configuration information indicative of a configuration for communicating with a UE. The reception component 1102 and/or the transmission component 1104 may communicate, within a time period, with the UE via a primary communication path comprising a link between a network node and the first electromagnetic radiation reflection relay network node and a link between the first electromagnetic radiation reflection relay network node and the UE. The reception component 1102 may receive, from the network node, additional configuration information that configures the first electromagnetic radiation reflection relay network node to transmit at least one SSB associated with the first electromagnetic radiation reflection relay network node. The transmission component 1104 may transmit the at least one SSB. The reception component 1102 may obtain, from the network node, an indication of a time raster for timing transmission of the at least one SSB, wherein transmitting the at least one SSB comprises transmitting the at least one SSB based on the time raster.

The communication manager 1106 may communicate, during an initial time period occurring prior to the time period, with the UE only via the primary communication path and in association with a first phase matrix associated with the first electromagnetic radiation reflection relay network node. The reception component 1102 may obtain, from the network node, configuration information indicative of a primary phase matrix for communicating with the UE, wherein communicating with the UE via the primary communication path within the time period comprises communicating data in association with the primary phase matrix. The communication manager 1106 may communicate, within the time period, with the UE via at least one secondary communication path comprising a link between the UE and a second electromagnetic radiation reflection relay network node; a link between the second electromagnetic radiation reflection relay network node and the first electromagnetic radiation reflection relay network node; and the link between the network node and the first electromagnetic radiation reflection relay network node. The transmission component 1104 may transmit a communication indicative of the set of time resources.

The reception component 1102 may receive, from a network node, configuration information indicative of a configuration for communicating with a UE. The reception component 1102 and/or the transmission component 1104 may communicate, within a time period, with the UE via a secondary communication path comprising a link between a network node and a first electromagnetic radiation reflection relay network node and a link between the first electromagnetic radiation reflection relay network node and the second electromagnetic radiation reflection relay network node. The reception component 1102 may receive, from the first electromagnetic radiation reflection relay network node, at least one SSB associated with the first electromagnetic radiation reflection relay network node, wherein communicating with the UE via the secondary communication path comprises communicating with the UE via the secondary communication path based on receiving the at least one SSB.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: communicating, within a time period, with a network node via a primary communication path comprising a link between the network node and a first electromagnetic radiation reflection relay network node and a link between the first electromagnetic radiation reflection relay network node and the UE; and communicating, within the time period, with the network node via at least one secondary communication path comprising a link between the UE and a second electromagnetic radiation reflection relay network node.

Aspect 2: The method of Aspect 1, wherein the at least one secondary communication path further comprises: a link between the second electromagnetic radiation reflection relay network node and the first electromagnetic radiation reflection relay network node; and a link between the first electromagnetic radiation reflection relay network node and the network node.

Aspect 3: The method of either of aspects 1 or 2, wherein communicating via the primary communication path comprises communicating data in association with a primary phase matrix associated with the first electromagnetic radiation reflection relay network node and, wherein communicating via the at least one secondary communication path comprises communicating the data in association with at least one secondary phase matrix associated with at least one of the second electromagnetic radiation reflection relay network node or at least one additional electromagnetic radiation reflection relay network node.

Aspect 4: The method of any of Aspects 1-3, wherein communicating via the primary communication path comprises communicating in association with at least one of a wide-beam radiation pattern associated with the first electromagnetic radiation reflection relay network node or a multi-lobe radiation pattern associated with the first electromagnetic radiation reflection relay network node.

Aspect 5: The method of any of Aspects 1-4, wherein communicating via the at least one secondary communication path comprises communicating in association with at least one of a wide-beam radiation pattern associated with the first electromagnetic radiation reflection relay network node or a multi-lobe radiation pattern associated with the first electromagnetic radiation reflection relay network node.

Aspect 6: The method of any of Aspects 1-5, wherein communicating via the primary communication path comprises communicating in association with a first power level associated with the first electromagnetic radiation reflection relay network node, and wherein communicating via the at least one secondary communication path comprises communicating in association with a second power level associated with the second electromagnetic radiation reflection relay network node.

Aspect 7: The method of Aspect 6, wherein the second power level is higher than the first power level.

Aspect 8: The method of any of Aspects 1-7, further comprising providing, to the network node, channel state information (CSI) indicative of a first value of a channel parameter associated with the link between the UE and the second electromagnetic radiation reflection relay network node and a second value of the channel parameter associated with a link between the UE and a third electromagnetic radiation reflection relay network node, wherein communicating via the at least one secondary communication path comprises communicating via the at least one secondary communication path based on the CSI satisfying a link condition.

Aspect 9: The method of Aspect 8, wherein the channel parameter comprises at least one of a received power at the UE, a multiplexing gain at the UE, or an interference level at the UE.

Aspect 10: The method of either of aspects 8 or 9, wherein the CSI satisfies the link condition based on the first value satisfying a channel parameter threshold.

Aspect 11: The method of any of Aspects 8-10, wherein the CSI satisfies the link condition based on the first value being greater than the second value.

Aspect 12: The method of any of Aspects 8-11, wherein the at least one secondary communication path comprises the link between the UE and the third electromagnetic radiation reflection relay network node.

Aspect 13: The method of any of Aspects 1-12, wherein communicating via the at least one secondary communication path comprises communicating in accordance with a spatial division multiplexing scheme in which a first beam is associated with the first electromagnetic radiation reflection relay network node and a second beam is associated with the second electromagnetic radiation reflection relay network node.

Aspect 14: The method of any of Aspects 1-13, wherein communicating via the at least one secondary communication path comprises communicating, based on the first electromagnetic radiation reflection relay network node and the second electromagnetic radiation reflection relay network node being associated with a common frequency band, in accordance with a time division multiplexing scheme.

Aspect 15: The method of any of Aspects 1-13, wherein communicating via the at least one secondary communication path comprises communicating, based on the first electromagnetic radiation reflection relay network node being associated with a first frequency band and the second electromagnetic radiation reflection relay network node being associated with a second, different, frequency band, in accordance with a frequency division multiplexing scheme.

Aspect 16: The method of any of Aspects 1-15, wherein communicating via the at least one secondary communication path comprises communicating via the at least one secondary communication path in association with a low-latency communication scheme.

Aspect 17: The method of any of Aspects 1-16, wherein communicating via the at least one secondary communication path comprises communicating via the at least one secondary communication path in association with a link failure prediction.

Aspect 18: The method of any of Aspects 1-17, wherein communicating via the at least one secondary communication path comprises communicating via the at least one secondary communication path in association with a set of time resources.

Aspect 19: The method of Aspect 18, wherein the set of time resources comprises at least one of a symbol, a slot, or a frame.

Aspect 20: The method of either of aspects 18 or 19, further comprising receiving, from the network node, a communication indicative of the set of time resources.

Aspect 21: The method of Aspect 20, wherein the communication comprises at least one of a radio resource control message or a dynamic control communication.

Aspect 22: A method of wireless communication performed by a network node, comprising: communicating, within a time period, with a user equipment (UE) via a primary communication path comprising a link between the network node and a first electromagnetic radiation reflection relay network node and a link between the first electromagnetic radiation reflection relay network node and the UE; and communicating, within the time period, with the UE via at least one secondary communication path comprising a link between the UE and a second electromagnetic radiation reflection relay network node.

Aspect 23: The method of Aspect 22, wherein the at least one secondary communication path further comprises: a link between the second electromagnetic radiation reflection relay network node and the first electromagnetic radiation reflection relay network node; and a link between the first electromagnetic radiation reflection relay network node and the network node.

Aspect 24: The method of either of aspects 22 or 23, further comprising providing, to the first electromagnetic radiation reflection relay network node, configuration information that configures the first electromagnetic radiation reflection relay network node to transmit at least one synchronization signal block (SSB) associated with the first electromagnetic radiation reflection relay network node.

Aspect 25: The method of Aspect 24, wherein the configuration information indicates a time raster for timing transmission of the at least one SSB.

Aspect 26: The method of either of Aspects 24 or 25, further comprising providing, to the first electromagnetic radiation reflection relay network node, an indication of a time raster for timing transmission of the at least one SSB.

Aspect 27: The method of any of Aspects 22-26, further comprising: communicating, during an initial time period occurring prior to the time period, with the UE only via the primary communication path and in association with a first phase matrix associated with the first electromagnetic radiation reflection relay network node; and providing, to the first electromagnetic radiation reflection relay network node, configuration information indicative of a primary phase matrix for communicating with the UE, wherein communicating with the UE via the primary communication path within the time period comprises communicating data in association with the primary phase matrix.

Aspect 28: The method of any of Aspects 22-27, wherein communicating via the primary communication path comprises communicating in association with at least one of a wide-beam radiation pattern associated with the first electromagnetic radiation reflection relay network node or a multi-lobe radiation pattern associated with the first electromagnetic radiation reflection relay network node.

Aspect 29: The method of any of Aspects 22-28, wherein communicating via the at least one secondary communication path comprises communicating in association with at least one of a wide-beam radiation pattern associated with the first electromagnetic radiation reflection relay network node or a multi-lobe radiation pattern associated with the first electromagnetic radiation reflection relay network node.

Aspect 30: The method of any of Aspects 22-29, wherein communicating via the primary communication path comprises communicating in association with a first power level associated with the first electromagnetic radiation reflection relay network node, and wherein communicating via the at least one secondary communication path comprises communicating in association with a second power level associated with the second electromagnetic radiation reflection relay network node.

Aspect 31: The method of Aspect 30, wherein the second power level is higher than the first power level.

Aspect 32: The method of any of Aspects 22-31, further comprising obtaining, from the UE, channel state information (CSI) indicative of a first value of a channel parameter associated with the link between the UE and the second electromagnetic radiation reflection relay network node and a second value of the channel parameter associated with a link between the UE and a third electromagnetic radiation reflection relay network node, wherein communicating via the at least one secondary communication path comprises communicating via the at least one secondary communication path based on the CSI satisfying a link condition.

Aspect 33: The method of Aspect 32, wherein the channel parameter comprises at least one of a received power at the UE, a multiplexing gain at the UE, or an interference level at the UE.

Aspect 34: The method of either of aspects 32 or 33, wherein the CSI satisfies the link condition based on the first value satisfying a channel parameter threshold.

Aspect 35: The method of any of Aspects 32-34, wherein the CSI satisfies the link condition based on the first value being greater than the second value.

Aspect 36: The method of any of Aspects 32-35, wherein the at least one secondary communication path comprises the link between the UE and the third electromagnetic radiation reflection relay network node.

Aspect 37: The method of any of Aspects 22-36, further comprising designating the first electromagnetic radiation reflection relay network node as a primary electromagnetic radiation reflection relay network node and the second electromagnetic radiation reflection relay network node as a second electromagnetic radiation reflection relay network node.

Aspect 38: The method of any of Aspects 22-37, wherein communicating via the at least one secondary communication path comprises communicating in accordance with a spatial division multiplexing scheme in which a first beam is associated with the first electromagnetic radiation reflection relay network node and a second beam is associated with the second electromagnetic radiation reflection relay network node.

Aspect 39: The method of any of Aspects 22-38, wherein communicating via the at least one secondary communication path comprises communicating, based on the first electromagnetic radiation reflection relay network node and the second electromagnetic radiation reflection relay network node being associated with a common frequency band, in accordance with a time division multiplexing scheme.

Aspect 40: The method of any of Aspects 22-38, wherein communicating via the at least one secondary communication path comprises communicating, based on the first electromagnetic radiation reflection relay network node being associated with a first frequency band and the second electromagnetic radiation reflection relay network node being associated with a second, different, frequency band, in accordance with a frequency division multiplexing scheme.

Aspect 41: The method of any of Aspects 22-40, wherein communicating via the at least one secondary communication path comprises communicating via the at least one secondary communication path in association with a low-latency communication scheme.

Aspect 42: The method of any of Aspects 22-41, wherein communicating via the at least one secondary communication path comprises communicating via the at least one secondary communication path in association with a link failure prediction.

Aspect 43: The method of any of Aspects 22-42, wherein communicating via the at least one secondary communication path comprises communicating via the at least one secondary communication path in association with a set of time resources.

Aspect 44: The method of Aspect 43, wherein the set of time resources comprises at least one of a symbol, a slot, or a frame.

Aspect 45: The method of either of aspects 43 or 44, further comprising transmitting a communication indicative of the set of time resources.

Aspect 46: The method of Aspect 45, wherein the communication comprises at least one of a radio resource control message or a dynamic control communication.

Aspect 47: The method of Aspect 46, wherein transmitting the communication comprises transmitting the communication to at least one additional network node.

Aspect 48: The method of any of Aspects 22-47, further comprising receiving, from at least one additional network node, an indication of a selection window associated with at least one additional electromagnetic radiation reflection relay network node.

Aspect 49: The method of any of Aspects 22-48, further comprising receiving, from at least one additional network node, an indication of designation of the second electromagnetic radiation reflection relay network node as a primary electromagnetic radiation reflection relay network node associated with the at least one additional network node.

Aspect 50: The method of any of Aspects 22-49, further comprising providing, to at least one additional network node, an indication of a selection window associated with at least one additional electromagnetic radiation reflection relay network node.

Aspect 51: The method of any of Aspects 22-50, further comprising providing, to at least one additional network node, an indication of designation of the second electromagnetic radiation reflection relay network node as a primary electromagnetic radiation reflection relay network node associated with the network node.

Aspect 52: A method of wireless communication performed by a first electromagnetic radiation reflection relay network node, comprising: receiving, from a network node, configuration information indicative of a configuration for communicating with a user equipment (UE); and communicating, within a time period, with the UE via a primary communication path comprising a link between a network node and the first electromagnetic radiation reflection relay network node and a link between the first electromagnetic radiation reflection relay network node and the UE.

Aspect 53: The method of Aspect 52, further comprising: receiving, from the network node, additional configuration information that configures the first electromagnetic radiation reflection relay network node to transmit at least one synchronization signal block (SSB) associated with the first electromagnetic radiation reflection relay network node; and transmitting the at least one SSB.

Aspect 54: The method of Aspect 53, wherein the configuration information indicates a time raster for timing transmission of the at least one SSB, wherein transmitting the at least one SSB comprises transmitting the at least one SSB based on the time raster.

Aspect 55: The method of either of Aspects 53 or 54, further comprising obtaining, from the network node, an indication of a time raster for timing transmission of the at least one SSB, wherein transmitting the at least one SSB comprises transmitting the at least one SSB based on the time raster.

Aspect 56: The method of any of Aspects 52-55, further comprising: communicating, during an initial time period occurring prior to the time period, with the UE only via the primary communication path and in association with a first phase matrix associated with the first electromagnetic radiation reflection relay network node; and obtaining, from the network node, configuration information indicative of a primary phase matrix for communicating with the UE, wherein communicating with the UE via the primary communication path within the time period comprises communicating data in association with the primary phase matrix.

Aspect 57: The method of any of Aspects 52-56, wherein communicating via the primary communication path comprises communicating in association with at least one of a wide-beam radiation pattern associated with the first electromagnetic radiation reflection relay network node or a multi-lobe radiation pattern associated with the first electromagnetic radiation reflection relay network node.

Aspect 58: The method of any of Aspects 52-57, further comprising communicating, within the time period, with the UE via at least one secondary communication path comprising: a link between the UE and a second electromagnetic radiation reflection relay network node; a link between the second electromagnetic radiation reflection relay network node and the first electromagnetic radiation reflection relay network node; and the link between the network node and the first electromagnetic radiation reflection relay network node.

Aspect 59: The method of Aspect 58, wherein communicating via the at least one secondary communication path comprises communicating in association with at least one of a wide-beam radiation pattern associated with the first electromagnetic radiation reflection relay network node or a multi-lobe radiation pattern associated with the first electromagnetic radiation reflection relay network node.

Aspect 60: The method of either of aspects 58 or 59, wherein communicating via the primary communication path comprises communicating in association with a first power level associated with the first electromagnetic radiation reflection relay network node, and wherein communicating via the at least one secondary communication path comprises communicating in association with a second power level associated with the second electromagnetic radiation reflection relay network node.

Aspect 61: The method of Aspect 60, wherein the second power level is higher than the first power level.

Aspect 62: The method of any of Aspects 58-61, wherein communicating via the at least one secondary communication path comprises communicating in accordance with a spatial division multiplexing scheme in which a first beam is associated with the first electromagnetic radiation reflection relay network node and a second beam is associated with the second electromagnetic radiation reflection relay network node.

Aspect 63: The method of any of Aspects 58-62, wherein communicating via the at least one secondary communication path comprises communicating, based on the first electromagnetic radiation reflection relay network node and the second electromagnetic radiation reflection relay network node being associated with a common frequency band, in accordance with a time division multiplexing scheme.

Aspect 64: The method of any of Aspects 58-62, wherein communicating via the at least one secondary communication path comprises communicating, based on the first electromagnetic radiation reflection relay network node being associated with a first frequency band and the second electromagnetic radiation reflection relay network node being associated with a second, different, frequency band, in accordance with a frequency division multiplexing scheme.

Aspect 65: The method of any of Aspects 58-64, wherein communicating via the at least one secondary communication path comprises communicating via the at least one secondary communication path in association with a low-latency communication scheme.

Aspect 66: The method of Aspect 65, wherein communicating via the at least one secondary communication path comprises communicating via the at least one secondary communication path in association with a link failure prediction.

Aspect 67: The method of any of Aspects 58-66, wherein communicating via the at least one secondary communication path comprises communicating via the at least one secondary communication path in association with a set of time resources.

Aspect 68: The method of Aspect 67, wherein the set of time resources comprises at least one of a symbol, a slot, or a frame.

Aspect 69: The method of either of aspects 67 or 68, further comprising transmitting a communication indicative of the set of time resources.

Aspect 70: The method of Aspect 69, wherein the communication comprises at least one of a radio resource control message or a dynamic control communication.

Aspect 71: The method of either of Aspects 69 or 70, wherein transmitting the communication comprises transmitting the communication to at least one additional network node.

Aspect 72: A method of wireless communication performed by a second electromagnetic radiation reflection relay network node, comprising: receiving, from a network node, configuration information indicative of a configuration for communicating with a user equipment (UE); and communicating, within a time period, with the UE via a secondary communication path comprising a link between a network node and a first electromagnetic radiation reflection relay network node and a link between the first electromagnetic radiation reflection relay network node and the second electromagnetic radiation reflection relay network node.

Aspect 73: The method of Aspect 72, further comprising receiving, from the first electromagnetic radiation reflection relay network node, at least one synchronization signal block (SSB) associated with the first electromagnetic radiation reflection relay network node, wherein communicating with the UE via the secondary communication path comprises communicating with the UE via the secondary communication path based on receiving the at least one SSB.

Aspect 74: The method of either of aspects 72 or 73, wherein communicating via the secondary communication path comprises communicating in association with at least one of a wide-beam radiation pattern associated with the first electromagnetic radiation reflection relay network node or a multi-lobe radiation pattern associated with the first electromagnetic radiation reflection relay network node.

Aspect 75: The method of any of Aspects 72-74, wherein communicating via the secondary communication path comprises communicating in association with a second power level associated with the second electromagnetic radiation reflection relay network node, the second power level being different than a first power level associated with a primary communication path comprising a link between the network node and the first electromagnetic radiation reflection relay network node and a link between the first electromagnetic radiation reflection relay network node and the UE.

Aspect 76: The method of Aspect 75, wherein the second power level is higher than the first power level.

Aspect 77: The method of any of Aspects 72-76, wherein communicating via the secondary communication path comprises communicating in accordance with a spatial division multiplexing scheme in which a first beam is associated with the first electromagnetic radiation reflection relay network node and a second beam is associated with the second electromagnetic radiation reflection relay network node.

Aspect 78: The method of any of Aspects 72-77, wherein communicating via the secondary communication path comprises communicating, based on the first electromagnetic radiation reflection relay network node and the second electromagnetic radiation reflection relay network node being associated with a common frequency band, in accordance with a time division multiplexing scheme.

Aspect 79: The method of any of Aspects 72-78, wherein communicating via the secondary communication path comprises communicating, based on the first electromagnetic radiation reflection relay network node being associated with a first frequency band and the second electromagnetic radiation reflection relay network node being associated with a second, different, frequency band, in accordance with a frequency division multiplexing scheme.

Aspect 80: The method of any of Aspects 72-79, wherein communicating via the secondary communication path comprises communicating via the secondary communication path in association with a low-latency communication scheme.

Aspect 81: The method of any of Aspects 72-80, wherein communicating via the secondary communication path comprises communicating via the secondary communication path in association with a link failure prediction.

Aspect 82: The method of any of Aspects 72-81, wherein communicating via the secondary communication path comprises communicating via the secondary communication path in association with a set of time resources.

Aspect 83: The method of Aspect 82, wherein the set of time resources comprises at least one of a symbol, a slot, or a frame.

Aspect 84: An apparatus for wireless communication at a device, comprising a processor; memory coupled with the processor; and instructions stored in the memory and executable by the processor to cause the apparatus to perform the method of one or more of Aspects 1-21.

Aspect 85: A device for wireless communication, comprising a memory and one or more processors coupled to the memory, the one or more processors configured to perform the method of one or more of Aspects 1-21.

Aspect 86: An apparatus for wireless communication, comprising at least one means for performing the method of one or more of Aspects 1-21.

Aspect 87: A non-transitory computer-readable medium storing code for wireless communication, the code comprising instructions executable by a processor to perform the method of one or more of Aspects 1-21.

Aspect 88: A non-transitory computer-readable medium storing a set of instructions for wireless communication, the set of instructions comprising one or more instructions that, when executed by one or more processors of a device, cause the device to perform the method of one or more of Aspects 1-21.

Aspect 89: An apparatus for wireless communication at a device, comprising a processor; memory coupled with the processor; and instructions stored in the memory and executable by the processor to cause the apparatus to perform the method of one or more of Aspects 22-51.

Aspect 90: A device for wireless communication, comprising a memory and one or more processors coupled to the memory, the one or more processors configured to perform the method of one or more of Aspects 22-51.

Aspect 91: An apparatus for wireless communication, comprising at least one means for performing the method of one or more of Aspects 22-51.

Aspect 92: A non-transitory computer-readable medium storing code for wireless communication, the code comprising instructions executable by a processor to perform the method of one or more of Aspects 22-51.

Aspect 93: A non-transitory computer-readable medium storing a set of instructions for wireless communication, the set of instructions comprising one or more instructions that, when executed by one or more processors of a device, cause the device to perform the method of one or more of Aspects 22-51.

Aspect 94: An apparatus for wireless communication at a device, comprising a processor; memory coupled with the processor; and instructions stored in the memory and executable by the processor to cause the apparatus to perform the method of one or more of Aspects 52-71.

Aspect 95: A device for wireless communication, comprising a memory and one or more processors coupled to the memory, the one or more processors configured to perform the method of one or more of Aspects 52-71.

Aspect 96: An apparatus for wireless communication, comprising at least one means for performing the method of one or more of Aspects 52-71.

Aspect 97: A non-transitory computer-readable medium storing code for wireless communication, the code comprising instructions executable by a processor to perform the method of one or more of Aspects 52-71.

Aspect 98: A non-transitory computer-readable medium storing a set of instructions for wireless communication, the set of instructions comprising one or more instructions that, when executed by one or more processors of a device, cause the device to perform the method of one or more of Aspects 52-71.

Aspect 99: An apparatus for wireless communication at a device, comprising a processor; memory coupled with the processor; and instructions stored in the memory and executable by the processor to cause the apparatus to perform the method of one or more of Aspects 72-83.

Aspect 100: A device for wireless communication, comprising a memory and one or more processors coupled to the memory, the one or more processors configured to perform the method of one or more of Aspects 72-83.

Aspect 101: An apparatus for wireless communication, comprising at least one means for performing the method of one or more of Aspects 72-83.

Aspect 102: A non-transitory computer-readable medium storing code for wireless communication, the code comprising instructions executable by a processor to perform the method of one or more of Aspects 72-83.

Aspect 103: A non-transitory computer-readable medium storing a set of instructions for wireless communication, the set of instructions comprising one or more instructions that, when executed by one or more processors of a device, cause the device to perform the method of one or more of Aspects 72-83.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors coupled to the one or more memories, the one or more processors individually or collectively configured to cause the UE to:

communicate, within a time period, with a network node via a primary communication path comprising a link between the network node and a first electromagnetic radiation reflection relay network node and a link between the first electromagnetic radiation reflection relay network node and the UE;

communicate, within the time period, with the network node via at least one secondary communication path comprising a link between the UE and a second electromagnetic radiation reflection relay network node, wherein the second electromagnetic radiation reflection relay network node is in an occupied state that prevents the second electromagnetic radiation reflection relay network node from being utilized by other network nodes; and provide, to the network node, channel state information (CSI) indicative of a first value of a channel parameter associated with the link between the UE and the second electromagnetic radiation reflection relay network node and a second value of the channel parameter associated with a link between the UE and a third electromagnetic radiation reflection relay network node.

2. The UE of claim 1, wherein the at least one secondary communication path further comprises:

a link between the second electromagnetic radiation reflection relay network node and the first electromagnetic radiation reflection relay network node; and the link between the network node and the first electromagnetic radiation reflection relay network node.

3. The UE of claim 1, wherein the one or more processors, to cause the UE to communicate via the primary communication path, are individually or collectively configured to cause the UE to communicate data in association with a primary phase matrix associated with the first electromagnetic radiation reflection relay network node and, wherein the one or more processors, to cause the UE to communicate via the at least one secondary communication path, are individually or collectively configured to cause the UE to communicate the data in association with at least one secondary phase matrix associated with at least one of the second electromagnetic radiation reflection relay network node or the third electromagnetic radiation reflection relay network node.

4. The UE of claim 1, wherein the one or more processors, to cause the UE to communicate via the primary communication path, are individually or collectively configured to cause the UE to communicate in association with at least one of a wide-beam radiation pattern associated with the first electromagnetic radiation reflection relay network node or a multi-lobe radiation pattern associated with the first electromagnetic radiation reflection relay network node.

5. The UE of claim 1, wherein the one or more processors, to cause the UE to communicate via the at least one secondary communication path, are individually or collectively configured to cause the UE to communicate in association with at least one of a wide-beam radiation pattern associated with the first electromagnetic radiation reflection relay network node or a multi-lobe radiation pattern associated with the first electromagnetic radiation reflection relay network node.

6. The UE of claim 1, wherein the one or more processors, to cause the UE to communicate via the primary communication path, are individually or collectively configured to cause the UE to communicate in association with a first power level associated with the first electromagnetic radiation reflection relay network node, and wherein the one or more processors, to cause the UE to communicate via the at least one secondary communication path, are individually or collectively configured to cause the UE to communicate in association with a second power level associated with the second electromagnetic radiation reflection relay network node.

7. The UE of claim 6, wherein the second power level is higher than the first power level.

8. The UE of claim 1, wherein the one or more processors, to cause the UE to communicate via the at least one secondary communication path, are individually or collectively configured to cause the UE to communicate via the at least one secondary communication path based on the CSI satisfying a link condition.

9. The UE of claim 8, wherein the channel parameter comprises at least one of a received power at the UE, a multiplexing gain at the UE, or an interference level at the UE.

10. The UE of claim 8, wherein the CSI satisfies the link condition based on the first value satisfying a channel parameter threshold.

11. The UE of claim 8, wherein the CSI satisfies the link condition based on the first value being greater than the second value.

12. The UE of claim 1, wherein the at least one secondary communication path comprises the link between the UE and the third electromagnetic radiation reflection relay network node.

13. The UE of claim 1, wherein the one or more processors, to cause the UE to communicate via the at least one secondary communication path, are individually or collectively configured to cause the UE to communicate in accordance with a spatial division multiplexing scheme in which a first beam is associated with the first electromagnetic radiation reflection relay network node and a second beam is associated with the second electromagnetic radiation reflection relay network node.

14. The UE of claim 1, wherein the one or more processors, to cause the UE to communicate via the at least one secondary communication path, are individually or collectively configured to cause the UE to communicate, based on the first electromagnetic radiation reflection relay network node and the second electromagnetic radiation reflection relay network node being associated with a common frequency band, in accordance with a time division multiplexing scheme.

15. The UE of claim 1, wherein the one or more processors, to cause the UE to communicate via the at least one secondary communication path, are individually or collectively configured to cause the UE to communicate, based on the first electromagnetic radiation reflection relay network node being associated with a first frequency band and the second electromagnetic radiation reflection relay network node being associated with a second, different, frequency band, in accordance with a frequency division multiplexing scheme.

16. The UE of claim 1, wherein the one or more processors, to cause the UE to communicate via the at least one secondary communication path, are individually or collectively configured to cause the UE to communicate via the at least one secondary communication path in association with a low-latency communication scheme.

17. The UE of claim 1, wherein the one or more processors, to cause the UE to communicate via the at least one secondary communication path, are individually or collectively configured to cause the UE to communicate via the at least one secondary communication path in association with a link failure prediction.

18. The UE of claim 1, wherein the one or more processors, to cause the UE to communicate via the at least one secondary communication path, are individually or collectively configured to cause the UE to communicate via the at least one secondary communication path in association with a set of time resources.

19. The UE of claim 18, wherein the set of time resources comprises at least one of a symbol, a slot, or a frame.

20. The UE of claim 18, wherein the one or more processors are further individually or collectively configured to cause the UE to receive, from the network node, a communication indicative of the set of time resources, wherein the second electromagnetic radiation reflection relay network node is in the occupied state during an amount of time corresponding to the set of time resources, and wherein the communication indicative of the set of time resources comprises a dynamic time raster.

21. The UE of claim 18, wherein the one or more processors are further individually or collectively configured to cause the UE to receive, from the network node, a communication indicative of the set of time resources, the communication comprising a radio resource control message.

22. A network node for wireless communication, comprising:

one or more memories; and one or more processors coupled to the one or more memories, the one or more processors individually or collectively configured to cause the network node to:

communicate, within a time period, with a user equipment (UE) via a primary communication path comprising a link between the network node and a first electromagnetic radiation reflection relay network node and a link between the first electromagnetic radiation reflection relay network node and the UE;

communicate, within the time period, with the UE via at least one secondary communication path comprising a link between the UE and a second electromagnetic radiation reflection relay network node, wherein the second electromagnetic radiation reflection relay network node is in an occupied state that prevents the second electromagnetic radiation reflection relay network node from being utilized by other network nodes; and receive, from the UE, channel state information (CSI) indicative of a first value of a channel parameter associated with the link between the UE and the second electromagnetic radiation reflection relay network node and a second value of the channel parameter associated with a link between the UE and a third electromagnetic radiation reflection relay network node.

23. The network node of claim 22, wherein the one or more processors are further individually or collectively configured to cause the network node to provide, to the first electromagnetic radiation reflection relay network node, configuration information that configures the first electromagnetic radiation reflection relay network node to transmit at least one synchronization signal block (SSB) associated with the first electromagnetic radiation reflection relay network node.

24. The network node of claim 22, wherein the one or more processors are further individually or collectively configured to cause the network node to:

communicate, during an initial time period occurring prior to the time period, with the UE only via the primary communication path and in association with a first phase matrix associated with the first electromagnetic radiation reflection relay network node; and provide, to the first electromagnetic radiation reflection relay network node, configuration information indicative of a primary phase matrix for communicating with the UE, wherein communicating with the UE via the primary communication path within the time period comprises communicating data in association with the primary phase matrix.

25. A first electromagnetic radiation reflection relay network node for wireless communication, comprising:

one or more memories; and one or more processors coupled to the one or more memories, the one or more processors individually or collectively configured to cause the first electromagnetic radiation reflection relay network node to:

receive, from a network node, configuration information indicative of a configuration for communicating with a user equipment (UE);

communicate, within a time period, with the UE via a primary communication path comprising a link between the network node and the first electromagnetic radiation reflection relay network node and a link between the first electromagnetic radiation reflection relay network node and the UE; and receive, from the UE, channel state information (CSI) indicative of a first value of a channel parameter associated with the link between the first electromagnetic radiation reflection relay network node and the UE and a second value of the channel parameter associated with a link between the UE and a second electromagnetic radiation reflection relay network node, wherein the second electromagnetic radiation reflection relay network node is in an occupied state that prevents the second electromagnetic radiation reflection relay network node from being utilized by other network nodes.

26. The first electromagnetic radiation reflection relay network node of claim 25, wherein the one or more processors are further individually or collectively configured to cause the first electromagnetic radiation reflection relay network node to:

receive, from the network node, additional configuration information that configures the first electromagnetic radiation reflection relay network node to transmit at least one synchronization signal block (SSB) associated with the first electromagnetic radiation reflection relay network node; and transmit the at least one SSB.

27. The first electromagnetic radiation reflection relay network node of claim 25, wherein the one or more processors are further individually or collectively configured to cause the first electromagnetic radiation reflection relay network node to:

communicate, during an initial time period occurring prior to the time period, with the UE only via the primary communication path and in association with a first phase matrix associated with the first electromagnetic radiation reflection relay network node; and obtain, from the network node, configuration information indicative of a primary phase matrix for communicating with the UE, wherein communicating with the UE via the primary communication path within the time period comprises communicating data in association with the primary phase matrix.

28. A second electromagnetic radiation reflection relay network node for wireless communication, comprising:

one or more memories; and one or more processors coupled to the one or more memories, the one or more processors individually or collectively configured to cause the second electromagnetic radiation reflection relay network node to:

receive, from a network node, configuration information indicative of a configuration for communicating with a user equipment (UE); and communicate, within a time period, with the UE via a secondary communication path comprising a link between the network node and a first electromagnetic radiation reflection relay network node and a link between the first electromagnetic radiation reflection relay network node and the second electromagnetic radiation reflection relay network node, wherein the second electromagnetic radiation reflection relay network node is in an occupied state that prevents the second electromagnetic radiation reflection relay network node from being utilized by other network nodes; and receive, from the UE, channel state information (CSI) indicative of a first value of a channel parameter associated with a link between the first electromagnetic radiation reflection relay network node and the UE and a second value of the channel parameter associated with a link between the UE and the second electromagnetic radiation reflection relay network node.

29. The second electromagnetic radiation reflection relay network node of claim 28, wherein the one or more processors are further individually or collectively configured to cause the second electromagnetic radiation reflection relay network node to receive, from the first electromagnetic radiation reflection relay network node, at least one synchronization signal block (SSB) associated with the first electromagnetic radiation reflection relay network node, and wherein the one or more processors, to cause the second electromagnetic radiation reflection relay network node to communicate with the UE via the secondary communication path, are individually or collectively configured to cause the second electromagnetic radiation reflection relay network node to communicate with the UE via the secondary communication path based on receiving the at least one SSB.

30. The UE of claim 1, wherein the first electromagnetic radiation reflection relay network node comprises an assisting network node that facilitates discovery of the second electromagnetic radiation reflection relay network node.

* * * * *